United States Patent
Kagawa et al.

(10) Patent No.: US 7,221,791 B2
(45) Date of Patent: May 22, 2007

(54) COLOR CONVERTER AND COLOR CONVERTING METHOD

(75) Inventors: Shuichi Kagawa, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 819 days.

(21) Appl. No.: 10/399,901

(22) PCT Filed: Oct. 11, 2001

(86) PCT No.: PCT/JP01/08955

§ 371 (c)(1),
(2), (4) Date: Apr. 23, 2003

(87) PCT Pub. No.: WO03/034710

PCT Pub. Date: Apr. 24, 2003

(65) Prior Publication Data

US 2004/0109604 A1 Jun. 10, 2004

(51) Int. Cl.
*G06K 9/00* (2006.01)
(52) U.S. Cl. .................. 382/167; 382/166; 382/274; 358/518
(58) Field of Classification Search ............... 382/166, 382/167, 274; 358/518–523, 1.9; 348/461
See application file for complete search history.

(56) References Cited

U.S. PATENT DOCUMENTS

| | | | |
|---|---|---|---|
| 5,357,353 A | | 10/1994 | Hirota |
| 5,461,429 A | * | 10/1995 | Konishi et al. ............. 348/656 |
| 5,568,284 A | * | 10/1996 | Oku et al. .................. 358/518 |
| 5,588,050 A | | 12/1996 | Kagawa et al. |
| 5,729,360 A | | 3/1998 | Kita et al. |
| 6,262,817 B1 | * | 7/2001 | Sato et al. .................. 358/518 |
| 6,333,965 B1 | * | 12/2001 | Van Berkel ................ 378/98.7 |
| 6,337,692 B1 | * | 1/2002 | Rai et al. .................... 345/594 |

(Continued)

FOREIGN PATENT DOCUMENTS

EP 1 435 729 7/2004

(Continued)

*Primary Examiner*—Matthew C. Bella
*Assistant Examiner*—Ali Bayat
(74) *Attorney, Agent, or Firm*—Birch, Stewart, Kolasch & Birch, LLP

(57) ABSTRACT

The present invention relates to processes of color data, and an object of the present invention is to provide a color converter and color converting method, with a color converting process for enhancing the saturation for color data, capable of preventing the influences of noise components from being emphasized and also preventing damaged color from occurring.

In order to achieve the object, multiplication coefficient calculation means calculates a multiplication coefficient based on characteristic information of first color data which is a target of color conversion, and second color correction amount calculation means calculates a second color correction amount by multiplying a first color correction amount by the multiplication coefficient obtained from first color correction amount calculation means. Then, in color correction amount addition means, the second color correction amount is added to the first color data, so that second color data after the color conversion is obtained. Since the second color correction amount is calculated on the basis of the first characteristic information, it is possible to prevent the influences of noise components from being emphasized, and also to prevent damaged color from occurring.

23 Claims, 19 Drawing Sheets

U.S. PATENT DOCUMENTS

| | | |
|---|---|---|
| 6,434,268 B1 | 8/2002 | Asamura et al. |
| 6,690,487 B1 | 2/2004 | Yamazaki |
| 7,031,516 B2 * | 4/2006 | Niko .......................... 382/167 |
| 2002/0080379 A1 * | 6/2002 | Iwaki ......................... 358/1.13 |

FOREIGN PATENT DOCUMENTS

| | | |
|---|---|---|
| JP | 60-220660 A | 11/1985 |
| JP | 63-39188 B2 | 8/1988 |
| JP | 4-304775 A | 10/1992 |
| JP | 4-335771 A | 11/1992 |
| JP | 4-369969 A | 12/1992 |
| JP | 5-115001 A | 5/1993 |
| JP | 5-244405 A | 9/1993 |
| JP | 11-69181 | 3/1999 |
| JP | 11-285019 A | 10/1999 |
| JP | 11-308472 | 11/1999 |
| JP | 2000-134498 | 5/2000 |
| WO | WO 03/034710 | 4/2003 |

* cited by examiner

F I G . 5
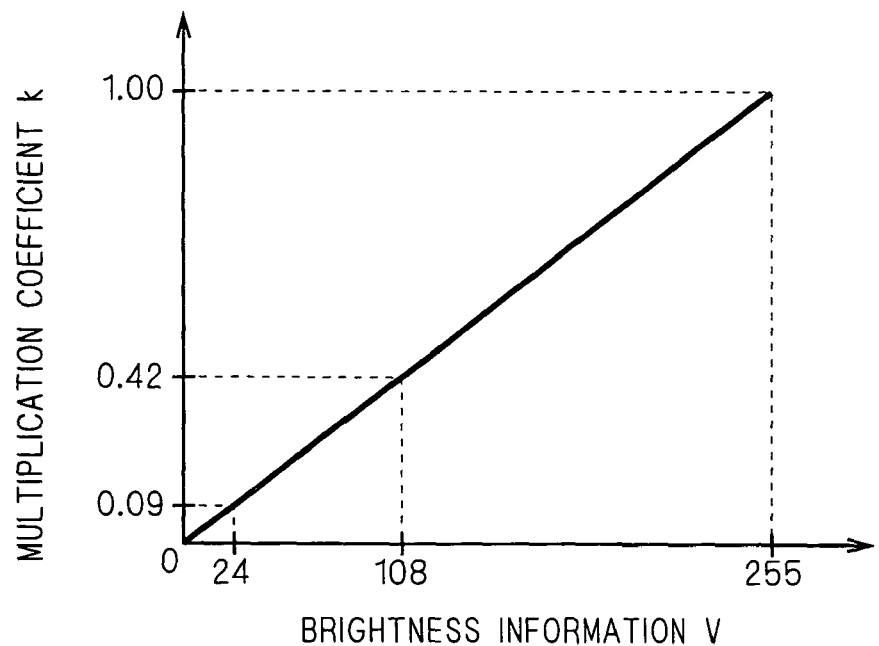
F I G . 6
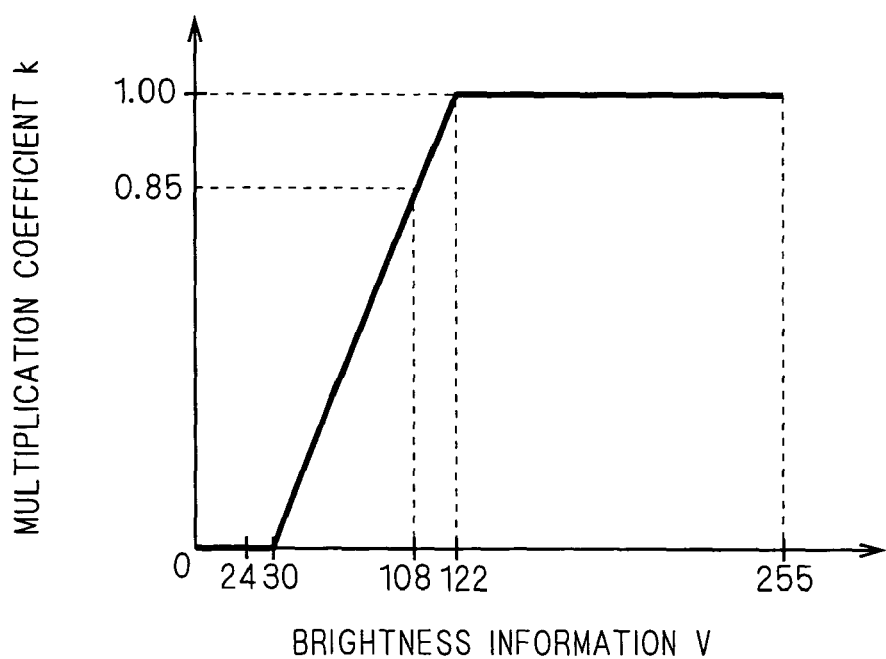

F I G . 1 2
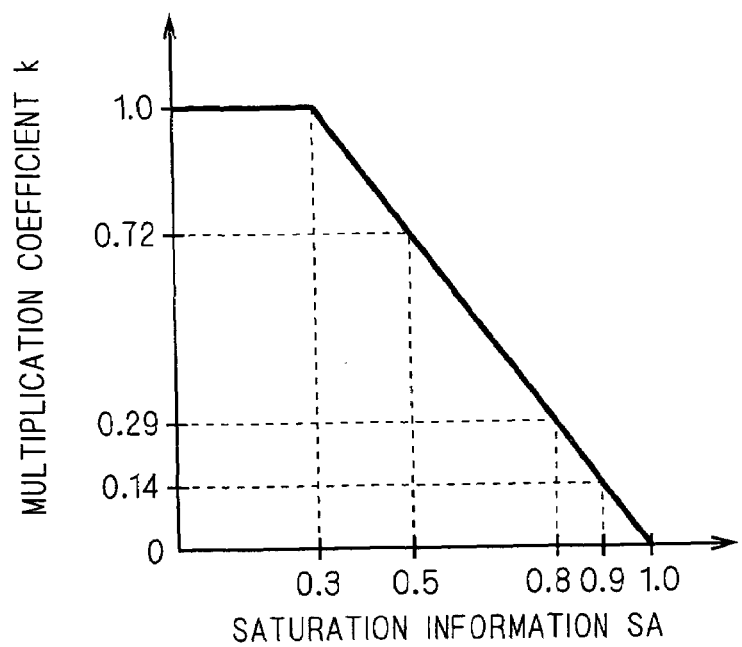
F I G . 1 3
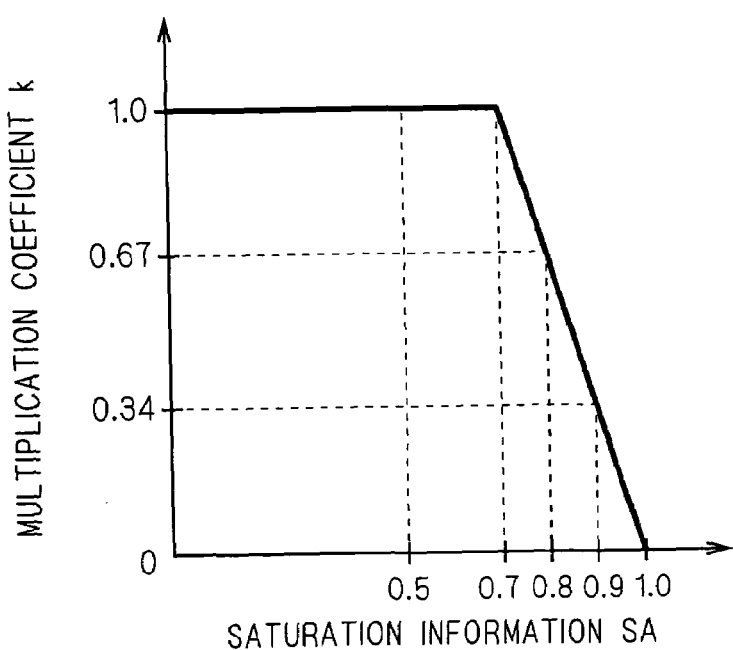

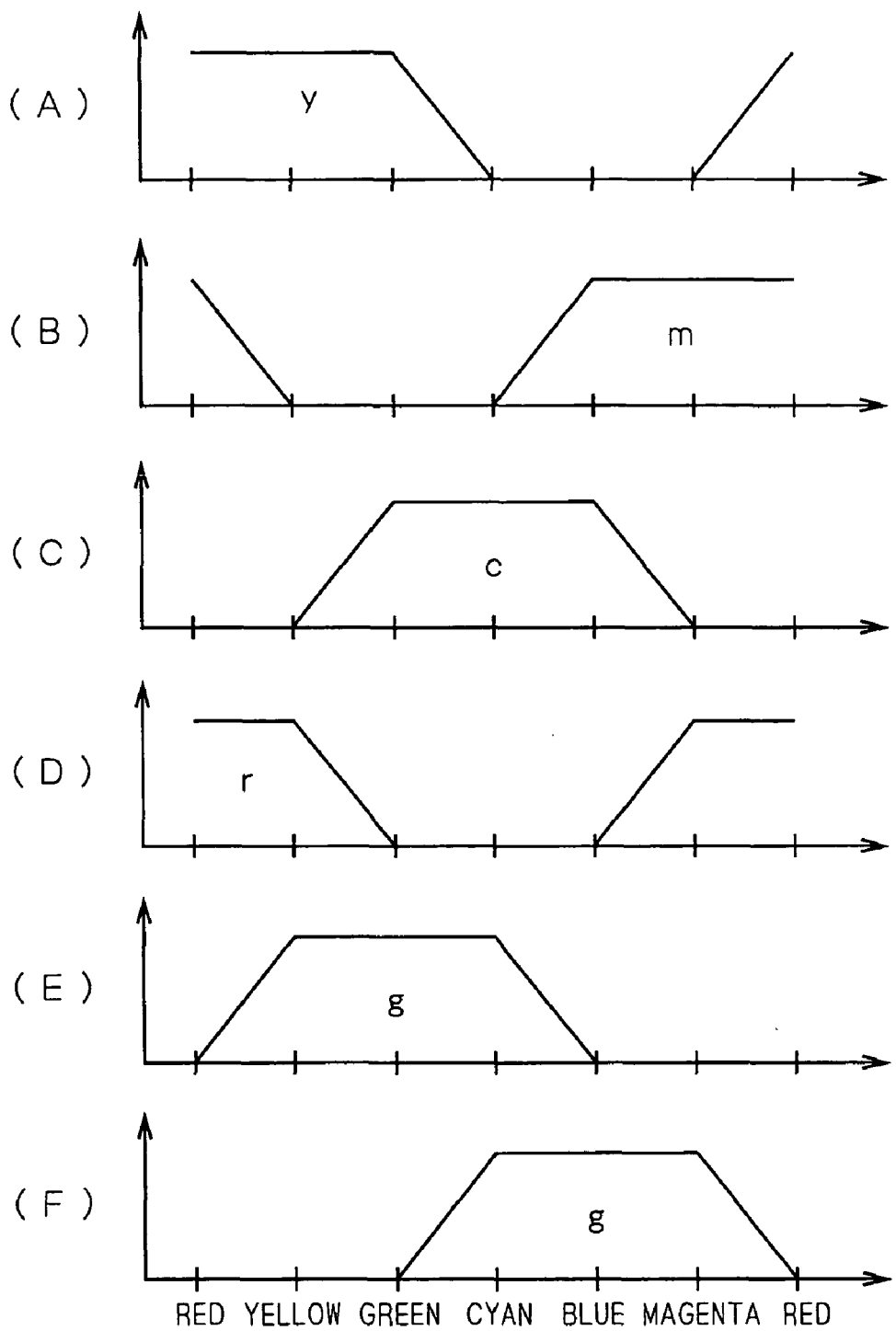
F I G . 1 4

| HUE | EFFECTIVE FIRST OPERATION TERMS |
|---|---|
| RED | h1r |
| GREEN | h1g |
| BLUE | h1b |
| CYAN | h1c |
| MAGENTA | h1m |
| YELLOW | h1y |

(b)

| INTER-HUE AREA | EFFECTIVE SECOND OPERATION TERMS |
|---|---|
| RED~YELLOW | h2ry |
| YELLOW~GREEN | h2gy |
| GREEN~CYAN | h2gc |
| CYAN~BLUE | h2bc |
| BLUE~MAGENTA | h2bm |
| MAGENTA~RED | h2rm |

FIG. 21

| IDENTIFICATION CODE S1 | MAXIMUM VALUE β | MAXIMUM VALUE α | HUE DATA TO BE ZERO |
|---|---|---|---|
| 0 | Ri | Gi | g, c |
| 1 | Ri | Bi | b, c |
| 2 | Gi | Ri | r, m |
| 3 | Gi | Bi | b, m |
| 4 | Bi | Ri | r, y |
| 5 | Bi | Gi | g, y |

FIG. 22

| IDENTIFICATION CODE S1 | Q1 | Q2 | P1 | P2 |
|---|---|---|---|---|
| 0 | r | b | m | y |
| 1 | r | g | y | m |
| 2 | g | b | c | y |
| 3 | g | r | y | c |
| 4 | b | g | c | m |
| 5 | b | r | m | c |

F I G . 2 3
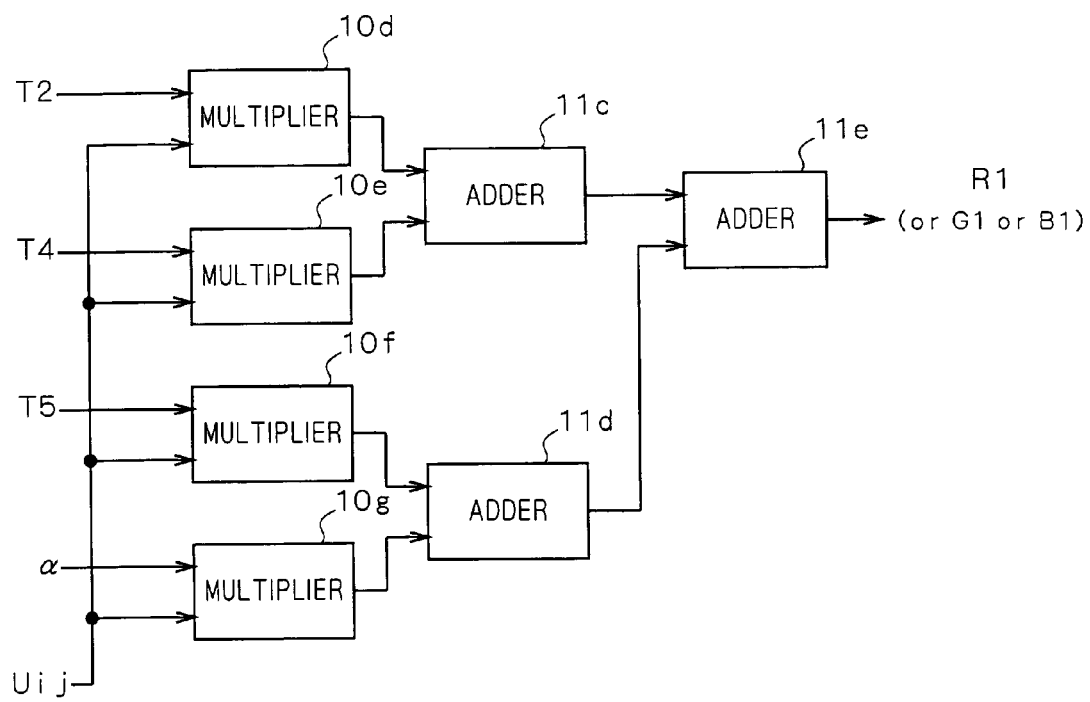

FIG. 24
(a)
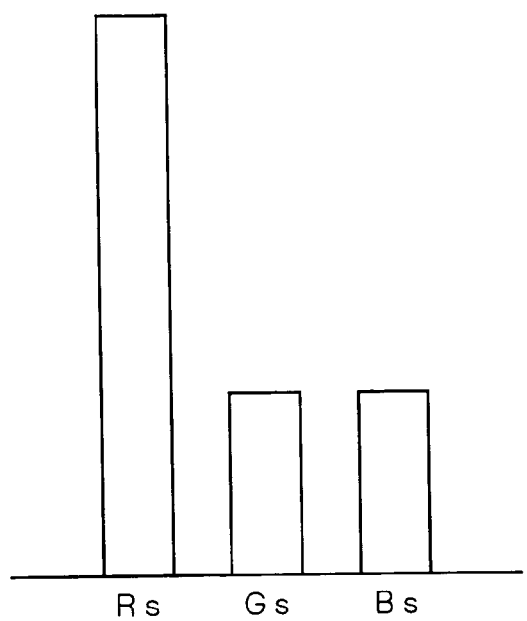
(b)
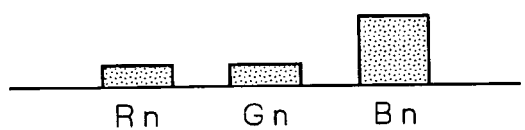
(c)
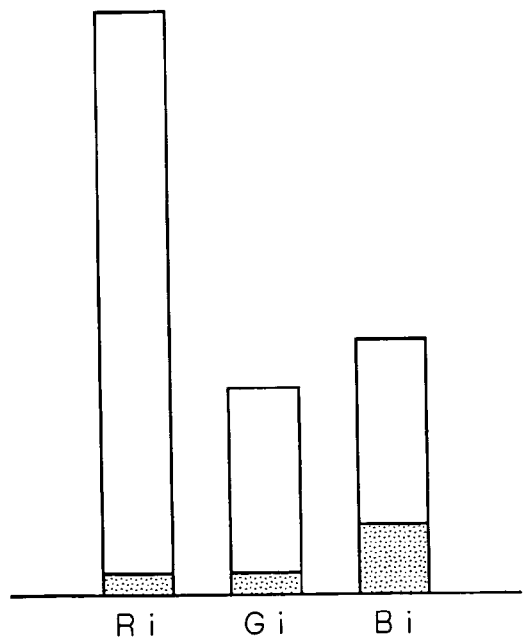

FIG. 25
(a)
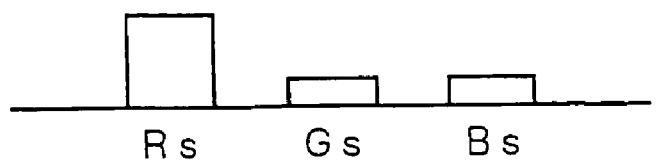
(b)
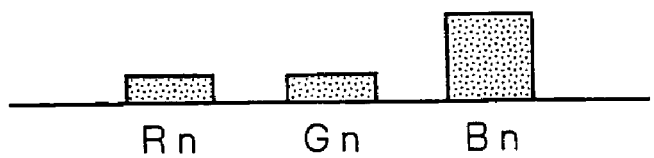
(c)
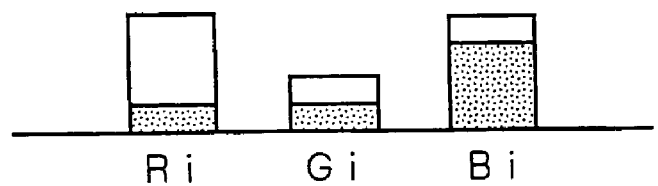

COLOR CONVERTER AND COLOR CONVERTING METHOD

This application is the national phase under 35 U.S.C. § 371 of PCT International Application No. PCT/JP01/08955 which has an International filing date of Oct. 11, 2002, which designated the United States of America.

TECHNICAL FIELD

The present invention relates to a full-color printing related apparatus such as a printer, a video printer and a scanner, an image-processing apparatus for forming computer graphics images, or color-data-processing apparatuses to be used in display devices such as monitors, and more particularly, concerns a color converter that carries out a color conversion process on color data and a color converting method.

BACKGROUND ART

In general, for example, in a full color printing related apparatus such as a printer, a video printer and a scanner, an image-processing apparatus for forming computer graphics images, or display devices such as monitors, a color conversion process is carried out on color data that constitute image data to be inputted to such a device.

The color conversion process in printing is an essential technique for correcting image-quality degradation caused by a color mixing property due to ink that does not have a pure color and a non-linear property of printed images and for outputting a printed image having good color reproducibility. Moreover, in a display device such as a monitor, when an image is displayed on the basis of inputted color data, a color conversion process is carried out so as to output (display) an image having desired color reproducibility in accordance with conditions of use, etc. of the device. Conventionally, with respect to the system for such a color conversion process, two kinds of systems, that is, a table conversion system and a matrix operation system, are listed.

Typical examples of the table conversion system include a three-dimensional look-up table system. In this system, for example, color data of red, green and blue or complementary color data of yellow, magenta and cyan (hereinafter, sometimes indicated as "Y, M, C"), which have been color corrected in accordance with values of color data that are subjects of color conversion represented by, for example, R, G, B (hereinafter, sometimes indicated as "R, G, B"), are preliminarily stored in a look up table that is constituted by a memory such as a ROM. When color data to be subjected to color conversion is inputted, the color data or complementary color data, which has been color-converted in accordance with the value, is extracted from a look up table, and outputted. In this method, the color data or complementary color data to be stored in the look up table is selected and adjusted so that a desired conversion characteristic can be adopted; thus, the resulting advantage is that it becomes possible to carry out a color conversion process that is superior in color reproducibility.

However, in such a simple arrangement in which data that has been color-converted on the basis of each of combinations of inputted color data is stored, the look up table requires a large capacity memory of approximately 400 Mbit. For example, Japanese Patent Application Laid-Open No. 63-227181 (1988) has disclosed a compression method of a memory capacity; however, even in this method, a memory as great as approximately 5 Mbit is required.

Therefore, this system has problems in that, since a large capacity memory is required, it is not possible to constitute the color converter by using LSIs, and in that it is difficult to allow data that is stored in the memory to flexibly adapt to a change in conditions in use, etc.

Moreover, in the matrix operation system, for example, in the case where, on the basis of image data having the first color data, Ri, Gi, Bi, to be subjected to color conversion, the second color data Ro, Go, Bo that have been color-converted are found, the following equation (1) serves as a basic operation expression.

$$\begin{bmatrix} Ro \\ Go \\ Bo \end{bmatrix} = (Aij) \begin{bmatrix} Ri \\ Gi \\ Bi \end{bmatrix} \qquad \text{Equation (1)}$$

In equation (1), Aij represents a coefficient matrix, and in Aij, i=1 to 3 and j=1 to 3. As indicated by equation (1), this system makes it possible to calculate the second color data by carrying out the matrix operation on the first color data; therefore, different from the above-mentioned table conversion system, it is not necessary to store data that corresponds to each of combinations of inputted color data. Thus, it becomes possible to avoid the problem caused by the necessity of a large capacity memory such as seen in the table conversion system.

Here, in general, desired color reproduction by the use of color conversion includes "faithful color reproduction" and "preferable color reproduction". "Faithful color reproduction" refers to color reproduction that is faithful to an actual color, and with respect to a method for achieving this reproduction, the standard such as NTSC and sRGB may be used or a color reproducing process may be carried out by using standard color spaces. In contrast, "preferable color reproduction" refers to color reproduction in which human visual sensation characteristics and color memory are taken into consideration, that is, color reproduction which is desirably sensed by the human being; thus, this is not necessarily coincident with "faithful color reproduction".

For example, in the case of color reproduction in displayed TV images, in most cases, "preferable color reproduction" is carried out. In the color memory of the human being, for example, the color of the sky and the color of green lawn tend to be memorized with colors that are clearer, and have higher saturation than the actual colors. Therefore, in order to achieve "preferable color reproduction", in general, a color conversion process is carried out in a manner so as to make the saturation of a color higher than the inputted color data. In the faithful color reproduction also, there are many cases in which a color conversion process is carried out in a manner so as to make the saturation of a color higher than the inputted color data.

Moreover, the color data to be inputted to an image display apparatus or the like is not necessarily coincident with the original color data that is generated by a color-data generating device such as a camera. This is because color data is subjected to various noises while it is transmitted.

For example, suppose that the original color data, generated by a camera, are transmitted through a transfer path, and inputted to an image display device. Here, it is assumed that the original color data outputted from the camera are Rs, Gs, Bs that are respective color data representing red, green and blue. Further, it is assumed that the color data to be inputted to an image display device through the transfer path are Ri, Gi, Bi. In other words, if the color data are not subjected to influences of noise through the transfer path and if the transmitting and receiving sequences at the time of the transfer process are carried out correctly, Rs=Ri, Gs=Gi and Bs=Bi are supposed to be satisfied.

However, in the actual transfer path, the data are susceptible to influences from noise. Moreover, any error might occur in the transmitting and receiving sequences. In this case, supposing that noise components including noise and errors that give influences on the respective color data of red, green and blue are Rn, Gn, Bn, the color data Ri, Gi, Bi to be inputted to the image display device are represented by Ri=Rs+Rn, Gi=Gs+Gn and Bi=Bs+Bn. In other words, the color data Ri, Gi, Bi to be inputted to the image display device are represented by sums between the original color data components, Rs, Gs, Bs, and the noise components, Rn, Gn, Bn.

FIG. 24 shows an example of the original color data components, Rs, Gs, Bs, noise components, Rn, Gn, Bn and color data components Ri, Gi, Bi to be inputted to the image display device, in the case where the noise components are smaller than the original color data components. In this Figure, the axis of ordinates represents the size of signals. Here, it is assumed that each of the color data components representing red, green and blue and the noise components is represented by an integer in a range of 0 to 255. Moreover, FIG. 24(a) shows the original color data components, Rs, Gs, Bs, generated by a camera or the like, in which Rs=192, Gs=64 and Bs=64. FIG. 24(b) shows an example of the noise components, Rn, Gn, Bn, in which Rn=8, Gn=8 and Bn=24. FIG. 24(c) shows the color data components Ri, Gi, Bi to be inputted to the image display device at this time. As described above, Ri, Gi, Bi of FIG. 24(c) are obtained from the sums of Rs, Gs, Bs shown in FIG. 24(a) and Rn, Gn, Bn shown in FIG. 24(b), so that Ri=200, Gi=72 and Bi=88.

As indicated by FIG. 24(a), the original color data, Rs, Gs, Bs, exhibit a red color in this example. In contrast, it is found that the color data, Ri, Gi, Bi, to be inputted to the image display device, shown in FIG. 24(c), exhibit a slightly bluish red color due to the influences of noise components Rn, Gn, Bn.

Moreover, FIG. 25 shows an example of the original color data components, Rs, Gs, Bs, noise components, Rn, Gn, Bn and color data components Ri, Gi, Bi to be inputted to the image display device, in the case where the noise components are greater than the original color data components (that is, the case when the original color data components are smaller). In this Figure also, the axis of ordinates represents the size of signals. Furthermore, FIG. 25(a) shows an example of the original color data components, Rs, Gs, Bs, in which Rs=24, Gs=8 and Bs=8. FIG. 25(b) shows an example of the noise components, Rn, Gn, Bn, in which Rn=8, Gn=8 and Bn=24 in the same manner as FIG. 24(b). FIG. 25(c) shows the color data components Ri, Gi, Bi to be inputted to the image display device at this time, and these are represented by the sums of Rs, Gs, Bs shown in FIG. 25(a) and Rn, Gn, Bn, shown in FIG. 25(b), so that Ri=32, Gi=16 and Bi=32.

The original color data components Rs, Gs, Bs, shown in FIG. 25(a), exhibit a red color. In contrast, the color data, Ri, Gi, Bi, to be inputted to the image display device shown in FIG. 25(c), have the blue color component of color data emphasized due to the influences of noise components Rn, Gn, Bn, thereby exhibiting a magenta color with a great change in the hue.

As indicated by the comparison between FIG. 24 and FIG. 25, when the noise components become greater than the original color data components, changes in characteristics (hue, brightness, saturation and the like) between the original color data and color data to be inputted to the image display device become greater due to influences by noise components. In other words, when the values of the original color data components, Rs, Gs, Bs, are small, as in the case of color data in a dark portion of an image, that is, when the brightness of the original color data is low, the influences of the noise components Rn, Gn, Bn become very strong.

Here, the following description will discuss a case in which, in order to achieve "preferable color reproduction" in an image display device, a color conversion process is carried out on each of inputted color data Ri=Rs+Rn, Gi=Gs+Gn and Bi=Bs+Bn by using a matrix operation system so as to increase the saturation of color. In this case, as indicated by the above-mentioned equation (1), simultaneously as the color conversion process for increasing the saturation is carried out on each of the original color data Rs, Gs, Bs, it is also carried out on each of the noise components Rn, Gn, Bn. In other words, when the color conversion process for increasing the saturation is carried out on each of the color data Ri, Gi, Bi containing noise components Rn, Gn, Bn, both of the saturation of the original color data components Rs, Gs, Bs and the saturation of the noise components Rn, Gn, Bn are increased.

Therefore, in particular, in the case where the original color data components Rs, Gs, Bs are small with the noise components, Rn, Gn, Bn, being relatively great, such a color conversion process mainly increases the saturation of each of the noise components Rn, Gn, Bn. In other words, the color conversion process tends to greatly emphasize the influences from noise and errors. The resulting problem is that in the color conversion device using the matrix operation system, influences from noise and influences from errors relating to transmitting and receiving processes become conspicuous in a portion having a low brightness in each of the original color data components Rs, Gs, Bs, that is, in a dark portion of an image.

As described above, in particular, in the case of a color conversion process that is carried out on color data at a portion in which the original color data components are small with low brightness, careful consideration should be given so as not to emphasize the influences of noise and the influences of errors relating to transmitting and receiving processes. However, in the conventional color converting method using the matrix operation system as defined by the above-mentioned equation (1), since no consideration is given to the characteristics such as brightness of color data to be inputted to the image display device, it is not possible to solve the problem in which the influences of noise components become conspicuous at a dark portion in an image.

The following description will discuss a color converter using the conventional matrix operation system. FIG. 26 shows a block diagram showing the configuration of a color converter using the conventional matrix operation system. In FIG. 26, reference numeral 101 is color correction amount calculation means, and 102 is color correction amount addition means.

The above-mentioned equation (1) is also represented by the following equation (2), and its color conversion process is achieved by the arrangement of the color converter shown in FIG. 26.

$$\begin{bmatrix} Ro \\ Go \\ Bo \end{bmatrix} = \begin{bmatrix} 1 & 0 & 0 \\ 0 & 1 & 0 \\ 0 & 0 & 1 \end{bmatrix} \begin{bmatrix} Ri \\ Gi \\ Bi \end{bmatrix} + (A1ij) \begin{bmatrix} Ri \\ Gi \\ Bi \end{bmatrix} \quad \text{Equation (2)}$$

$$= \begin{bmatrix} Ri \\ Gi \\ Bi \end{bmatrix} + (A1ij) \begin{bmatrix} Ri \\ Gi \\ Bi \end{bmatrix}$$

In the coefficient matrix A1$ij$ in equation (2), i=1 to 3, and j=1 to 3.

The first color data Ri, Gi, Bi that are subjected to color conversion are inputted to the color correction amount calculation means 101. In the color correction amount calculation means 101, color correction amounts R1$a$, G1$a$, B1$a$ that correspond to the first color data Ri, Gi, Bi are calculated through a linear operation shown in the following equation (3), and the resulting values are outputted to the color correction amount addition means 102.

$$\begin{bmatrix} R1a \\ G1a \\ B1a \end{bmatrix} = (A1ij) \begin{bmatrix} Ri \\ Gi \\ Bi \end{bmatrix} \quad \text{Equation (3)}$$

Moreover, the first color data Ri, Gi, Bi are also inputted to the color correction amount addition means 102. The color correction amount addition means 102 adds the color data Ri, Gi, Bi and the color correction amounts R1$a$, G1$a$, B1$a$, and outputs the resulting second color data Ro, Go, Bo after the color conversion. Here, as described above, in the conventional color-conversion device, upon calculation of the color correction amounts R1$a$, G1$a$, B1$a$ by the color correction amount calculation means 101, the characteristics such as brightness of the first color data Ri, Gi, Bi to be inputted thereto are not taken into consideration.

In this manner, in the color converter using the conventional matrix operation system, the color conversion process is carried out without taking the characteristics such as brightness of the first color data Ri, Gi, Bi to be inputted to the device into consideration. For this reason, the same color conversion process is carried out in both of the cases in which, for example, color data components are small with influences of noise components being strongly exerted thereon and in which color data components are great with influences of noise components being weakly exerted on color data. Thus, when a color conversion process for increasing the saturation of the color data is carried out, that is, when a color-emphasizing process is carried out, the influences are further emphasized at a dark portion of the image that is seriously susceptible to the influences of noise components. For this reason, instead of improving the image, the color-conversion process causes a defective image to be displayed on an image display device or the like.

Another problem is that since the color-conversion process is carried out without taking the characteristics of the first color data Ri, Gi, Bi to be inputted to the color converter into consideration, so-called "damaged color" in which fine color differences disappear in bright colors due to the color conversion tends to occur. Referring to specific examples, the following description will discuss this problem in detail. In the following description, it is assumed that respective color data components are represented by integers in a range from 0 to 255, and that in the results of matrix calculations, first decimal in color data is rounded to the nearest whole number.

Here, in a coefficient matrix in the operation carried out by the color correction amount calculation means 101 of the color converter shown in FIG. 26, that is, the coefficient matrix A1$ij$ in the above-mentioned equations (2) and (3), is represented by values shown in the following equation (4).

$$(A1ij) = \begin{bmatrix} 0.2 & -0.1 & -0.1 \\ -0.1 & 0.2 & -0.1 \\ -0.1 & -0.1 & 0.2 \end{bmatrix} \quad \text{Equation (4)}$$

In this case, for example, when Ri=230, Gi=20, Bi=20 are inputted as the first color data, the results of calculations are Ro=272, Go=−1, Bo=−1, if no limitation is given to the range in which the second color data Ro, Go, Bo are located. However, since Ro, Go, Bo are integers in the range of 0 to 255, the second color data to be actually outputted from the color converter are: Ro=255, Go=0, Bo=0.

Moreover, when the first color data, Ri=240, Gi=15, Bi=15, are inputted, Ro=285, Go=−8, Bo=−8 are supposed to be given, if no limitation is given to the range in which the second color data Ro, Go, Bo are located. However, since the second color data, Ro, Go, Bo are integers in the range of 0 to 255, the actual values are: Ro=255, Go=0, Bo=0.

In this manner, in the conventional color converter, the values of the second color data, obtained in the case where the first color data, Ri=230, Gi=20, Bi=20, are inputted, become the same as the values of the second color data obtained in the case where the first color data, Ri=240, Gi=15, Bi=15 are inputted. In other words, in both of the cases in which Ri=230, Gi=20, Bi=20 and in which Ri=240, Gi=15, Bi=15, the same color is displayed on the image display device, failing to express the difference in colors originally exists between the two data.

As described above, when the color conversion process is carried out on the basis of the matrix operation system without taking the characteristics of the color data Ri, Gi, Bi to be inputted to the device into consideration, damaged color in which fine color differences disappear in colors having high brightness tends to occur.

Moreover, this damaged color also tends to occur when a color conversion process for further enhancing the saturation of a color is carried out on color data that is originally high in the saturation. Referring to specific examples, the following description will discuss this problem.

The saturation Sat of color data represented by, for example, R, G, B, is defined by the following equation (5) by using MAX (R, G, B) that are maximum values of R, G, B and MIN (R, G, B) that are the minimum values thereof.

$$sat = (MAX(R,G,B) - MIN(R,G,B))/MAX(R,G,B) \quad \text{Equation (5)}$$

Supposing that R, G, B are represented by integers from 0 to 255, the mono-color of red is represented by R=255, G=0, B=0, with its saturation being represented by Sat=1. Moreover, white is represented by R=255, G=255, B=255, with its saturation being represented by Sat=0. As also indicated by equation (5), in an attempt to enhance the saturation Sat, it is proposed to increase the value of MAX (R, G, B)−MIN(R, G, B).

Therefore, the saturation Sati of Ri, Gi, Bi to be inputted to the image display device is represented by the following equation (6) on the basis of the definition of equation (5):

$$sati=(MAX(Ri,Gi,Bi)-MIN(Ri,Gi,Bi))/MAX(Ri,Gi,Bi) \quad \text{Equation (6)}$$

In the same manner, the saturation Sato of color data Ro, Go, Bo to be obtained by a color conversion process is represented by the following equation (7):

$$sato=(MAX(Ro,Go,Bo)-MIN(Ro,Go,Bo))/MAX(Ro,Go,Bo) \quad \text{Equation (7)}$$

Here, in an attempt to increase the saturation of color data after color conversion by the color converter shown in FIG. 26, the coefficient matrix $A1ij$ of the above-mentioned equation (2) is set to values indicated by the following equation (8).

$$(A1ij) = \begin{bmatrix} 0.2 & -0.2 & -0.2 \\ -0.2 & 0.2 & -0.2 \\ -0.2 & -0.2 & 0.2 \end{bmatrix} \quad \text{Equation (8)}$$

In this case, suppose that, for example, Ri=255, Gi=128, Bi=128 are inputted to the converter shown in FIG. 26 as the first color data. At this time, the outputted second color data are represented by Ro=255, Go=77, Bo=77. In this case, the saturation Sati of the first color data Ri, Gi, Bi is approximately 0.5 on the basis of the above-mentioned equation (6), and the saturation Sato of the second color data Ro, Go, Bo is 0.7 on the basis of the above-mentioned equation (7). In other words, the saturation of the color data is enhanced by the color conversion process.

Here, suppose that the first color data, Ri=255, Gi=26, Bi=26 are inputted. At this time, the saturation Sati of the first color data Ri, Gi, Bi is 0.9. In this case, if no limitation is given to the range in which Ro, Go, Bo are located, the second color data are represented by Ro=296, Go=−25, Bo=−25. However, since Ro, Go, Bo are integers in the range of 0 to 255, the second color data are actually outputted as Ro=255, Go=0, Bo=0.

Moreover, suppose that the first color data, Ri=255, Gi=51, Bi=51 are inputted. At this time, the saturation Sati of the first color data Ri, Gi, Bi is 0.8. In this case, if no limitation is given to the range in which Ro, Go, Bo are located, the second color data are represented by Ro=286, Go=0, Bo=0. However, since Ro, Go, Bo are integers in the range of 0 to 255, the second color data are actually outputted as Ro=255, Go=0, Bo=0.

In this manner, the values of the second color data Ro, Go, Bo obtained in the case where the first color data are Ri=255, Gi=26, Bi=26 are the same as those values of the second color data Ro, Go, Bo obtained in the case where the first color data are Ri=255, Gi=51, Bi=51. In other words, in both of the cases in which Ri=255, Gi=26 and Bi=26 and in which Ri=255, Gi=51 and Bi=51, the same color is displayed on the image display device, failing to express a difference in colors that the two data originally have.

As described in the above-mentioned examples, when the color-conversion process is carried out by using a matrix operation system, without taking the characteristics of color data Ri, Gi, Bi to be inputted to the color converter into consideration, damaged color in which fine color differences disappear in colors with high saturation tends to occur.

As described above, the following problems have been raised in the conventional color converter. First, in the case where a color converter is arranged by a table conversion system using a memory such as a ROM, a large capacity memory is required, and the resulting problems are that it is not possible to constitute the color converter by using LSIs, and that it is not possible to flexibly change the conversion characteristics.

Here, in the case where the color converter is arranged by using a matrix operation system, it is not necessary to store data with a large capacity, making it possible to avoid problems that have been caused by the necessity of a large capacity memory in the color converter in the table conversion system. However, when a color conversion process for enhancing the saturation of the color data is carried out, problems tend to arise, in which: influences of noise components are further emphasized in the case of color data that have low brightness and are susceptible to the influences of noise components, or damaged color which fails to express fine color differences in colors having high brightness or in colors having high saturation tends to occur.

DISCLOSURE OF THE INVENTION

The present invention has been devised in order to solve the above-mentioned problems, and an object thereof is to provide a color converter and color converting method capable of preventing the influences of noise components from being emphasized in colors having low brightness and also preventing damaged color from occurring in colors having high brightness or high saturation, while capable of flexibly changing the conversion characteristics without the necessity of a large capacity memory, in a case where a color conversion process is carried out so as to enhance the saturation of color data inputted to the device.

In a first aspect of a color correcting device according to the present invention, a color converter which carries out color correction on first color data to convert to second color data corresponding to the first color data, including: first color correction amount calculation means for calculating a first color correction amount on the basis of the first color data by using a matrix computing system; multiplication coefficient calculation means for calculating a multiplication coefficient on the basis of characteristic information of the first color data; second color correction amount calculation means for calculating a second color correction amount by multiplying the first color collection amount by the multiplication coefficient; and color correction amount addition means for calculating the second color data by adding the second color correction amount to the first color data.

In a second aspect of the color correcting device according to the present invention, the characteristic information of the first color data is brightness.

In a third aspect of the color correcting device according to the present invention, the value of the multiplication coefficient calculated by the multiplication coefficient calculation means becomes smaller as the brightness becomes smaller than a predetermined value.

In a fourth aspect of the color correcting device according to the present invention, the value of the multiplication coefficient calculated by the multiplication coefficient calculation means becomes smaller as the brightness becomes larger than a predetermined value.

In a fifth aspect of the color correcting device according to the present invention, the characteristic information of the first color data is saturation.

In a sixth aspect of the color correcting device according to the present invention, the value of the multiplication coefficient calculated by the multiplication coefficient calculation means becomes smaller as the saturation becomes larger than a predetermined value.

In a seventh aspect of the color correcting device according to the present invention, the color converter further includes characteristic information calculation means for calculating the characteristic information on the basis of the first color data.

In an eighth aspect of the color correcting device according to the present invention, the characteristic information calculated by the characteristic information calculation means is brightness of the first color data, and the brightness is calculated as a sum of values obtained by multiplying the respective components of the first color data by predetermined coefficients.

In a ninth aspect of the color correcting device according to the present invention, the characteristic information calculated by the characteristic information calculation means is brightness of the first color data, and the brightness is calculated as the maximum value of the components of the first color data.

In a tenth aspect of the color correcting device according to the present invention, the characteristic information calculated by the characteristic information calculation means is saturation of the first color data, and the saturation is calculated on the basis of a difference between the maximum value of the components of the first color data and the minimum value of the components of the first color data.

In an eleventh aspect of the color correcting device according to the present invention, the multiplication coefficient calculation means includes a look up table storing the multiplication coefficient corresponding to the characteristic information.

In a twelfth aspect of the color correcting device according to the present invention, the first color data and the first color correction amounts are respectively Ri, Gi, Bi and R1, G1, B1 corresponding to three primary color signals of red, green and blue, and the first color correction calculation means includes: maximum value/minimum value calculation means for calculating the minimum value α and the maximum value β of the first color data; hue data calculation means for calculating six hue data: r=Ri−α, g=Gi−α, b=Bi−α, y=β−Bi, m=β−Gi and c=β−Ri, respectively relating to red, green, blue, yellow, magenta and cyan, from the first color data and the minimum value α and maximum value β calculated by the maximum value/minimum value calculation means; effective operation term calculation means for calculating, by using the hue data and a predetermined coefficients ap1 to ap6 and aq1 to aq6, a first effective operation term T2 having only a value which is not zero among h1r=MIN(y, m), h1g=MIN(c, y) and h1b=MIN(m, c) or a zero value when all the h1r,−h1g and h1b are zero, a second effective operation term T4 having only a value which is not zero among h1y=MIN(r, g), h1c=MIN(g, b) and h1m=MIN(b, r) or a zero value when all the h1y, h1c and him are zero, and a third effective operation term T5 having only a value which is not zero among h2ry=MIN(aq1×h1y, ap1×h1r), h2rm=MIN(aq2×h1m, ap2×h1r), h2gy=MIN (aq3×h1y, ap3×h1g), h2gc=MIN(aq4×h1c, ap4×h1g), h2bm=MIN(aq5×h1m, ap5×h1b) and h2bc=MIN (aq6×h1c, ap6×h1b) or a zero value when all the h2ry, h2rm, h2gy, h2gc, h2bm and h2bc are zero; coefficient generation means for calculating a coefficient matrix Uij on the basis of the minimum value α and maximum value β calculated by the maximum value/minimum value calculation means; and matrix operation means for carrying out the following matrix operation:

$$\begin{bmatrix} R1 \\ G1 \\ B1 \end{bmatrix} = (Uij) \begin{bmatrix} T2 \\ T4 \\ T5 \\ \alpha \end{bmatrix}$$

on the basis of the first effective operation term T2, second effective operation term T4 and third effective operation term T5 calculated by the operation term calculation means, the minimum value α calculated by the maximum value/minimum value calculation means and the coefficient matrix Uij calculated by the coefficient generation means, thereby calculating the first color correction amounts R1, G1, B1.

In a thirteenth aspect of a color correcting method according to the present invention, a color converting method which carries out color correction on first color data to convert to second color data corresponding to the first color data, includes the steps of: (a) calculating a first color correction amount on the basis of the first color data by using a matrix computing system; (b) calculating a multiplication coefficient on the basis of characteristic information of the first color data; (c) calculating a second color correction amount by multiplying the first color collection amount by the multiplication coefficient; and (d) calculating the second color data by adding the second color correction amount to the first color data.

In a fourteenth aspect of the color correcting method according to the present invention, the characteristic information of the first color data is brightness.

In a fifteenth aspect of the color correcting method according to the present invention, the value of the multiplication coefficient calculated in the step (b) becomes smaller as the brightness becomes smaller than a predetermined value.

In a sixteenth aspect of the color correcting method according to the present invention, the value of the multiplication coefficient calculated in the step (b) becomes smaller as the brightness becomes larger than a predetermined value.

In a seventeenth aspect of the color correcting method according to the present invention, the characteristic information of the first color data is saturation.

In an eighteenth aspect of the color correcting method according to the present invention, the value of the multiplication coefficient calculated in the step (b) becomes smaller as the saturation becomes larger than a predetermined value.

In a nineteenth aspect of the color correcting method according to the present invention, the color converting method further includes the step of: (e) calculating the characteristic information on the basis of the first color data.

In a twentieth aspect of the color correcting method according to the present invention, the characteristic information calculated in the step (e) is brightness of the first color data, and the brightness is calculated as a sum of values obtained by multiplying the respective components of the first color data by predetermined coefficients.

In a twenty-first aspect of the color correcting method according to the present invention, the characteristic information calculated in the step (e) is brightness of the first color data, and the brightness is calculated as the maximum value of the components of the first color data.

In a twenty-second aspect of the color correcting method according to the present invention, the characteristic information calculated in the step (e) is saturation of the first color data, and the saturation is calculated on the basis of a difference between the maximum value of the components of the first color data and the minimum value of the components of the first color data.

In a twenty-third aspect of the color correcting method according to the present invention, the first color data and the first color correction amounts are respectively Ri, Gi, Bi and R1, G1, B1 corresponding to three primary color signals of red, green and blue, and the step (c) includes the steps of: (f) calculating the minimum value $\alpha$ and the maximum value $\beta$ of the first color data; (g) calculating six hue data: r=Ri–$\alpha$, g=Gi–$\alpha$, b=Bi–$\alpha$, y=$\beta$–Bi, m=$\beta$–Gi and c=$\beta$–Ri, respectively relating to red, green, blue, yellow, magenta and cyan, from the first color data and the minimum value $\alpha$ and maximum value $\beta$ calculated in the step (f); (h) calculating, by using the hue data calculated in the step (g) and a predetermined coefficients ap1 to ap6 and aq1 to aq6, a first effective operation term T2 having only a value which is not zero among h1r=MIN(y, in), h1g=MIN(c, y) and h1b=MIN (m, c) or a zero value when all the h1r, h1g and h1b are zero, a second effective operation term T4 having only a value which is not zero among h1y=MIN(r, g) h1c=MIN(g, b) and h1m=MIN (b,r) or a zero value when all the h1y, h1c, and h1m are zero, and a third effective operation term T5 having only a value which is not zero among h2ry=MIN(aq1×h1y, ap1×h1r), h2rm=MIN(aq2×h1m, ap2×h1r), h2gy=MIN (aq3×h1y, ap3×h1g), h2gc=MIN(Aq4×h1c, ap4×h1g), h2bm+MIN (aq5×h1m, ap5×h1b) and h2bc=MIN (Aq6× h1c, ap6×h1b) or a zero value when all the h2ry, h2rm, h2gy, h2gc, h2bm and h2bc are zero; (i) calculating a coefficient matrix Uij on the basis of the $\alpha$ and $\beta$ calculated in the step (f); and (j) carrying out the following matrix $$\begin{bmatrix} R1 \\ G1 \\ B1 \end{bmatrix} = (Uij) \begin{bmatrix} T2 \\ T4 \\ T5 \\ \alpha \end{bmatrix}$$

on the basis of the first effective operation term T2, second effective operation term T4 and third effective operation term T5 calculated in the step (h), the minimum value a calculated in the step (f) and the coefficient matrix Uij calculated in the step (i), thereby calculating the first color correction amounts R1, G1, B1.

In a first aspect of a semiconductor device according to the present invention, since the color converter includes: first color correction amount calculation means for calculating a first color correction amount on the basis of the first color data by using a matrix computing system; multiplication coefficient calculation means for calculating a multiplication coefficient on the basis of characteristic information of the first color data; second color correction amount calculation means for calculating a second color correction amount by multiplying the first color collection amount by the multiplication coefficient; and color correction amount addition means for calculating the second color data by adding the second color correction amount to the first color data, it is possible to determine the degree of the influence of noise components in the first color data and the possibility of occurrence of damaged color due to the color conversion process on the basis of the characteristic information of the first color data. Consequently, when the inputted first color data are seriously susceptible to the noise components and when damaged color tends to occur in the color conversion process, the multiplication coefficient is set to a low level so that it is possible to solve the problem of emphasized influences of noise components and the problem of the occurrence of damaged color due to the color conversion process for enhancing the saturation, which have been caused by the color converter using the conventional matrix operation system.

Moreover, since the calculation of the first color correction amount is performed by using the matrix operation system, it is not necessary to use large capacity memories such as those required for the table conversion system. Therefore, it is possible to solve the problem of difficulty in applying LSIs and the problem of difficulty in flexibly changing conversion characteristics, which have been caused by the color converter using the conventional table conversion system.

In the second aspect of the color correcting device according to the present invention, the characteristic information of the first color data is brightness. Therefore, on the basis of the degree of brightness, it is possible to determine the degree of influences of noise components to the first color data and the possibility of generation of damaged color due to the color conversion process. Consequently, when the inputted first color data are seriously susceptible to the noise components and when damaged color tends to occur in the color conversion process, the multiplication coefficient is set to a low level so that it is possible to solve the problem of emphasized influences of noise components and the problem of the occurrence of damaged color due to the color conversion process for enhancing the saturation, which have been caused by the color converter using the conventional matrix operation system.

In the third aspect of the color correcting device of the present invention, the value of the multiplication coefficient calculated by the multiplication coefficient calculation means becomes smaller as the brightness becomes smaller than a predetermined value. Therefore, it is possible to reduce emphasized influences of noise components due to the color conversion process for enhancing the saturation in the case where the component of the first color data is small and seriously susceptible to the influences of noise components.

In the fourth aspect of the color correcting device according to the present invention, the value of the multiplication coefficient calculated by the multiplication coefficient calculation means becomes smaller as the brightness becomes larger than a predetermined value. Therefore, it is possible to reduce the generation of damaged color due to the color conversion process for enhancing the saturation, in the case where the brightness of the first color data is high and damaged color tends to occur.

In the fifth aspect of the color correcting device according to the present invention, the characteristic information of the first color data is saturation. Therefore, on the basis of the degree of saturation, it is possible to determine the possibility of generation of damaged color due to the color conversion process in the first color data. Consequently, when the inputted first color data are seriously susceptible to the noise components and when damaged color tends to occur in the color conversion process, the multiplication coefficient is set to a low level so that it becomes possible to solve the problem of emphasized influences of noise components and the problem of the occurrence of damaged color due to the color conversion process for enhancing the saturation, which have been caused by the color converter using the conventional matrix operation system.

In the sixth aspect of the color correcting device according to the present invention, the value of the multiplication coefficient calculated by the multiplication coefficient calculation means becomes smaller as the saturation becomes higher than a predetermined value. Therefore, it is possible to reduce the generation of damaged color due to the color conversion process for enhancing the saturation, in the case where the saturation of the first color data is high and damaged color tends to occur.

In the seventh aspect of the color correcting device according to the present invention, the color converter further includes characteristic information calculation means for calculating the characteristic information on the basis of the first color data. Therefore, the color correcting device is allowed to properly deal with a case where no characteristic information is externally inputted so that it needs to be calculated from the first color data.

In the eighth aspect of the color correcting device according to the present invention, the characteristic information calculated by the characteristic information calculation means is brightness of the first color data, and the brightness is calculated as a sum of values obtained by multiplying the respective components of the first color data by predetermined coefficients. Therefore, for example, by setting the coefficient by which each of the components of the first color data is multiplied to a value which is suitable for human visual sensation characteristics, it is possible to calculate and find brightness information that is close to human sensitivity. Moreover, in an attempt to find brightness information on the basis of the standard such as NTSC and sRGB or the standard color space, it is possible to easily obtain the information by altering the coefficient.

In the ninth aspect of the color correcting device according to the present invention, the characteristic information calculated by the characteristic information calculation means is brightness of the first color data, and the brightness is calculated as the maximum value of the components of the first color data. Therefore, it is not necessary to carry out a multiplying process so as to calculate the brightness, and it becomes possible to reduce the operation load imposed on the characteristic information calculation means, and also to reduce the circuit scale in the hardware configuration.

In the tenth aspect of the color correcting device according to the present invention, the characteristic information calculated by the characteristic information calculation means is saturation of the first color data, and the saturation is calculated on the basis of a difference between the maximum value of the components of the first color data and the minimum value of the components of the first color data. Therefore, the saturation is easily calculated by using the maximum value and the minimum value that are found by a smaller calculation load so that it becomes possible to reduce the operation load imposed on the characteristic information calculation means, and also to reduce the circuit scale in the hardware configuration. Moreover, the saturation is calculated as a difference between the maximum value of the components of the first data and the minimum value of the components of the first data so that the saturation is calculated by using only the subtracting process. Thus, it becomes possible to further improve the effects.

In the eleventh aspect of the color correcting device according to the present invention, the multiplication coefficient calculation means includes a look up table storing the multiplication coefficient corresponding to the characteristic information. Therefore, by rewriting the contents of the table, it becomes possible to easily achieve various characteristics without altering the circuit configuration.

Here, the look up table which is required for the multiplication coefficient calculation means in the present invention is achieved by a one-dimensional look up table associated with only the characteristic information of the first color data. In other words, it is not necessary to provide a large capacity look up table such as a three-dimensional look up table used in the conventional table conversion system.

In the twelfth aspect of the color correcting device according to the present invention, the first color data and the first color correction amounts are respectively Ri, Gi, Bi and R1, G1, B1 corresponding to three primary color signals of red, green and blue, and the first color correction calculation means includes: maximum value/minimum value calculation means for calculating the minimum value $\alpha$ and the maximum value $\beta$ of the first color data; hue data calculation means for calculating six hue data: r=Ri-', g=Gi-$\alpha$, b=Bi-$\alpha$, y=$\beta$-Bi, m=$\beta$-Gi and c=$\beta$-Ri, respectively relating to red, green, blue, yellow, magenta and cyan, from the first color data and the minimum value $\alpha$ and maximum value $\beta$ calculated by the maximum value/minimum value calculation means; effective operation term calculation means (18) for calculating, by using the hue data and a predetermined coefficients ap1 to ap6 and aq1 to aq6, a first effective operation term T2 having only a value which is not zero among h1r=MIN(y, m), h1g=MIN(c, y) and h1b=MIN (m, c) or a zero value when all the h1r, h1g and h1b are zero, a second effective operation term T4 having only a value which is not zero among h1y=MIN(r, g), h1c=MIN(g, b) and h1m=MIN(b, r) or a zero value when all the h1y, h1c and h1m are zero, and a third effective operation term T5 having only a value which is not zero among h2ry=MIN(aq1×h1y, ap1×h1r), h2rm=MIN(aq2×h1m, ap2×h1r), h2gy=MIN (aq3×h1y, ap3×h1g), h2gc=MIN(aq4×h1c, ap4×h1g), h2bm=MIN(aq5×h1m, ap5×h1b) and h2bc=MIN (aq6×h1c, ap6×h1b) or a zero value when all the h2ry, h2rm, h2gy, h2gc, h2bm and h2bc are zero; coefficient generation means for calculating a coefficient matrix Uij on the basis of the minimum value $\alpha$ and maximum value $\beta$ calculated by the maximum value/minimum value calculation means; and matrix operation means for carrying out the following matrix operation:

$$\begin{bmatrix} R1 \\ G1 \\ B1 \end{bmatrix} = (Uij) \begin{bmatrix} T2 \\ T4 \\ T5 \\ \alpha \end{bmatrix}$$

on the basis of the first effective operation term T2, second effective operation term T4 and third effective operation term T5 calculated by the operation term calculation means, the minimum value $\alpha$ calculated by the maximum value/ minimum value calculation means and the coefficient matrix Uij calculated by the coefficient generation means, thereby calculating the first color correction amounts R1, G1, B1. Therefore, it is possible to carry out a correction process on only a target hue or a predetermined area between hues in an independent manner, and also to correct the degree of a change in the area between hues in an independent manner. In other words, it is possible to flexibly change conversion characteristics.

Moreover, the matrix operation, which is originally carried out on the basis of the above-mentioned thirteen polynomial data: h1r, h1g, h1b, h1y, h1c, h1m, h2ry, h2gy, h2gc, h2bc, h2bm, h2rm and $\alpha$, can be carried out by using four effective polynomial data: the first effective operation term T2, the second effective operation term T4, the third effective operation term T5 and the minimum value α. Consequently, it becomes possible to greatly reduce the operation load to be imposed on the first color correction amount calculation means, and particularly to reduce the circuit scale greatly in the case of a hardware configuration.

In the thirteenth aspect of the color correcting method of the present invention, a color converting method which carries out color correction on first color data to convert to second color data corresponding to the first color data, includes the steps of: (a) calculating a first color correction amount on the basis of the first color data by using a matrix computing system; (b) calculating a multiplication coefficient on the basis of characteristic information of the first color data; (c) calculating a second color correction amount by multiplying the first color collection amount by the multiplication coefficient; and (d) calculating the second color data by adding the second color correction amount to the first color data. Therefore, it is possible to determine the degree of influences of noise components to the first color data and the possibility of generation of damaged color due to the color conversion process on the basis of the characteristic information of the first color data. Consequently, when the inputted first color data are seriously susceptible to the noise components and when damaged color tends to occur in the color conversion process, the multiplication coefficient is set to a low level so that it becomes possible to solve the problem of emphasized influences of noise components and the problem of the occurrence of damaged color due to the color conversion process for enhancing the saturation, which have been caused by the color converter using the conventional matrix operation system.

Moreover, since the first color correction amount is calculated by using the matrix operation system, it is not necessary to use large capacity memories such as those required for the table conversion system. Therefore, it is possible to solve the problem of difficulty in applying LSIs and the problem of difficulty in flexibly changing conversion characteristics, which have been caused by the color converter using the conventional table conversion system.

In the fourteenth aspect of the color correcting method according to the present invention, the characteristic information of the first color data is brightness. Therefore, on the basis of the degree of brightness, it is possible to determine the degree of influences of noise components to the first color data and the possibility of generation of damaged color due to the color conversion process. Consequently, when the inputted first color data are seriously susceptible to the noise components and when damaged color tends to occur in the color conversion process, the multiplication coefficient is set to a low level so that it becomes possible to solve the problem of emphasized influences of noise components and the problem of the occurrence of damaged color due to the color conversion process for enhancing the saturation, which have been caused by the color converting method using the conventional matrix operation system.

In the fifteenth aspect of the color correcting method according to the present invention, the value of the multiplication coefficient calculated in the step (b) becomes smaller as the brightness becomes smaller than a predetermined value. Therefore, it is possible to reduce emphasized influences of noise components due to the color conversion process for enhancing the saturation in the case where the component of the first color data is small and seriously susceptible to the influences of noise components.

In the sixteenth aspect of the color correcting method according to the present invention, the value of the multiplication coefficient calculated in the step (b) becomes smaller as the brightness becomes larger than a predetermined value. Therefore, it is possible to reduce the generation of damaged color due to the color conversion process for enhancing the saturation, in the case where the brightness of the first color data is high and damaged color tends to occur.

In the seventeenth aspect of the color correcting method according to the present invention, the characteristic information of the first color data is saturation. Therefore, on the basis of the degree of saturation, it is possible to determine the possibility of generation of damaged color due to the color conversion process in the first color data. Consequently, when the inputted first color data are seriously susceptible to the noise components and when damaged color tends to occur in the color conversion process, the multiplication coefficient is set to a low level so that it becomes possible to solve the problem of emphasized influences of noise components and the problem of the occurrence of damaged color due to the color conversion process for enhancing the saturation, which have been caused by the color converting method using the conventional matrix operation system.

In the eighteenth aspect of the color correcting method according to the present invention, the value of the multiplication coefficient calculated in the step (b) becomes smaller as the saturation becomes larger than a predetermined value. Therefore, it is possible to reduce the generation of damaged color due to the color conversion process for enhancing the saturation, in the case where the saturation of the first color data is high and damaged color tends to occur.

In the nineteenth aspect of the color correcting method according to the present invention, the color converting method further includes the step of: (e) calculating the characteristic information on the basis of the first color data. Therefore, the color correcting method is allowed to properly deal with a case where no characteristic information is externally inputted so that it needs to be calculated from the first color data.

In the twentieth aspect of the color correcting method according to the present invention, the characteristic information calculated in the step (e) is brightness of the first color data, and the brightness is calculated as a sum of values obtained by multiplying the respective components of the first color data by predetermined coefficients. Therefore, for example, by setting the coefficient by which each of the components of the first color data is multiplied to a value which is suitable for human visual sensation characteristics, it is possible to calculate and find brightness information that is close to human sensitivity. Moreover, in an attempt to find brightness information on the basis of the standard such as NTSC and sRGB or the standard color space, it is possible to easily obtain the information by altering the coefficient.

In the twenty-first aspect of the color correcting method according to the present invention, the characteristic information calculated in the step (e), is brightness of the color data, and the brightness is calculated as the maximum value of the components of the first color data. Therefore, it is not necessary to carry out a multiplying process so as to calculate the brightness, and it becomes possible to reduce the operation load imposed on the characteristic information calculation means, and also to reduce the circuit scale in the hardware configuration.

In the twenty-second aspect of the color correcting method of the present invention, the characteristic information calculated in the step (e) is saturation of the first color data, and the saturation is calculated on the basis of a difference between the maximum value of the components of the first color data and the minimum value of the components of the first color data. Therefore, the calculation of the saturation is easily carried out by using the maximum value and the minimum value that are found by a smaller calculation load so that it becomes possible to reduce the operation load imposed on the characteristic information calculation means, and also to reduce the circuit scale in the hardware configuration. Moreover, the saturation is calculated as a difference between the maximum value of the components of the first data and the minimum value of the components of the first data so that the saturation is calculated by using only the subtracting process; thus, it becomes possible to further improve the effects.

In the twenty-third aspect of the color correcting method of the present invention, the first color data and the first color correction amounts are respectively Ri, Gi, Bi and R1, G1, B1 corresponding to three primary color signals of red, green and blue, and the step (c) includes the steps of: (f) calculating the minimum value $\alpha$ and the maximum value $\beta$ of the first color data; (g) calculating six hue data: r=Ri−$\alpha$, g=Gi−$\alpha$, b=Bi−$\alpha$, y=$\beta$−Bi, m=$\beta$−Gi and c=$\beta$−Ri, respectively relating to red, green, blue, yellow, magenta and cyan, from the first color data and the minimum value $\alpha$ and maximum value $\beta$ calculated in the step (f) ; (h) calculating, by using the hue data calculated in the step (g) and a predetermined coefficients ap1 to ap6 and aq1 to aq6, a first effective operation term T2 having only a value which is not zero among h1r=MIN(y, m), h1g=MIN(c, y) and h1b=MIN(m, c) or a zero value when all the h1r, h1g and h1b are zero, a second effective operation term T4 having only a value which is not zero among h1y=MIN(r, g), h1c=MIN(g, b) and h1m=MIN(b, r) or a zero value when all the h1y, h1c and h1m are zero, and a third effective operation term T5 having only a value which is not zero among h2ry=MIN(aq1×h1y, ap1×h1r), h2rm=MIN(aq2×h1m, ap2×h1r), h2gy=MIN(aq3×h1y, ap3×h1g), h2gc=MIN(aq4×h1c, ap4×h1g), h2bm=MIN(aq5×h1m, ap5×h1b) and h2bc=MIN(aq6×h1c, ap6×h1b) or a zero value when all the h2ry, h2rm, h2gy, h2gc, h2bm and h2bc are zero; (i) calculating a coefficient matrix Uij on the basis of the $\alpha$ and $\beta$ calculated in the step (f); and (j) carrying out the following matrix operation:

$$\begin{bmatrix} R1 \\ G1 \\ B1 \end{bmatrix} = (Uij) \begin{bmatrix} T2 \\ T4 \\ T5 \\ \alpha \end{bmatrix}$$

on the basis of the first effective operation term T2, second effective operation term T4 and third effective operation term T5 calculated in the step (h), the minimum value $\alpha$ calculated in the step (f) and the coefficient matrix Uij calculated in the step (i), thereby calculating the first color correction amounts R1, G1, B1. Therefore, it is possible to carry out a correction process on only a target hue or a predetermined area between hues in an independent manner, and also to correct the degree of a change in the area between hues in an independent manner. In other words, it is possible to flexibly change conversion characteristics.

Moreover, the matrix operation, which is originally carried out on the basis of the above-mentioned thirteen polynomial data: h1r, h1g, h1b, h1y, h1c, h1m, h2ry, h2gy, h2gc, h2bc, h2bm, h2rm and $\alpha$, can be carried out by using four effective polynomial data: the first effective operation term T2, the second effective operation term T4, the third effective operation term T5 and the minimum value $\alpha$. Consequently, it becomes possible to greatly reduce the operation load to be imposed on the first color correction amount calculation means, and particularly to reduce the circuit scale greatly in the case of a hardware configuration.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a graph showing one example of the relationship between multiplication coefficient k and brightness information V to be stored in a look up table in the color converter according to embodiment 1;

FIG. 6 is a graph showing one example of the relationship between multiplication coefficient k and brightness information V to be stored in a look up table in the color converter according to embodiment 1;

FIG. 12 is a graph showing one example of the relationship between multiplication coefficient k and saturation information SA to be stored in a look up table in the color converter according to embodiment 5;

FIG. 13 is a graph showing one example of the relationship between multiplication coefficient k and saturation information SA to be stored in a look up table in the color converter according to embodiment 5;

FIGS. 14(A) to 14(F) are schematic diagrams showing the relationship between hue data r, g, b, y, m, c and six hues in embodiment 6;

FIGS. 18($a$) and 18($b$) are tables showing the corresponding relationship between six hues and areas between the hues and effective operation terms associated therewith in embodiment 6;

FIG. 21 is a diagram showing the corresponding relationship among the value of identification code S1, the maximum value $\beta$ and the minimum value $\alpha$ and hue data that are set to zero in the first color data, in embodiment 6;

FIG. 22 is a table for describing the operation of a zero-eliminating device in the color converter according to embodiment 6;

FIG. 23 is a block diagram showing a part of a configuration of a matrix computing unit in the color converter according to embodiment 6;

FIGS. 24($a$) to 24($c$) are graphs showing one example of the original color data components and noise components and color data components to be inputted to an image display device, in the case where the noise components are smaller than the original color data;

FIGS. 25($a$) to 25($c$) are graphs showing one example of the original color data components and noise components, and color data components to be inputted to an image display device, in the case where the noise components are greater than the original color data.

BEST MODES FOR CARRYING OUT THE INVENTION

1. Embodiment 1

Figure 1:
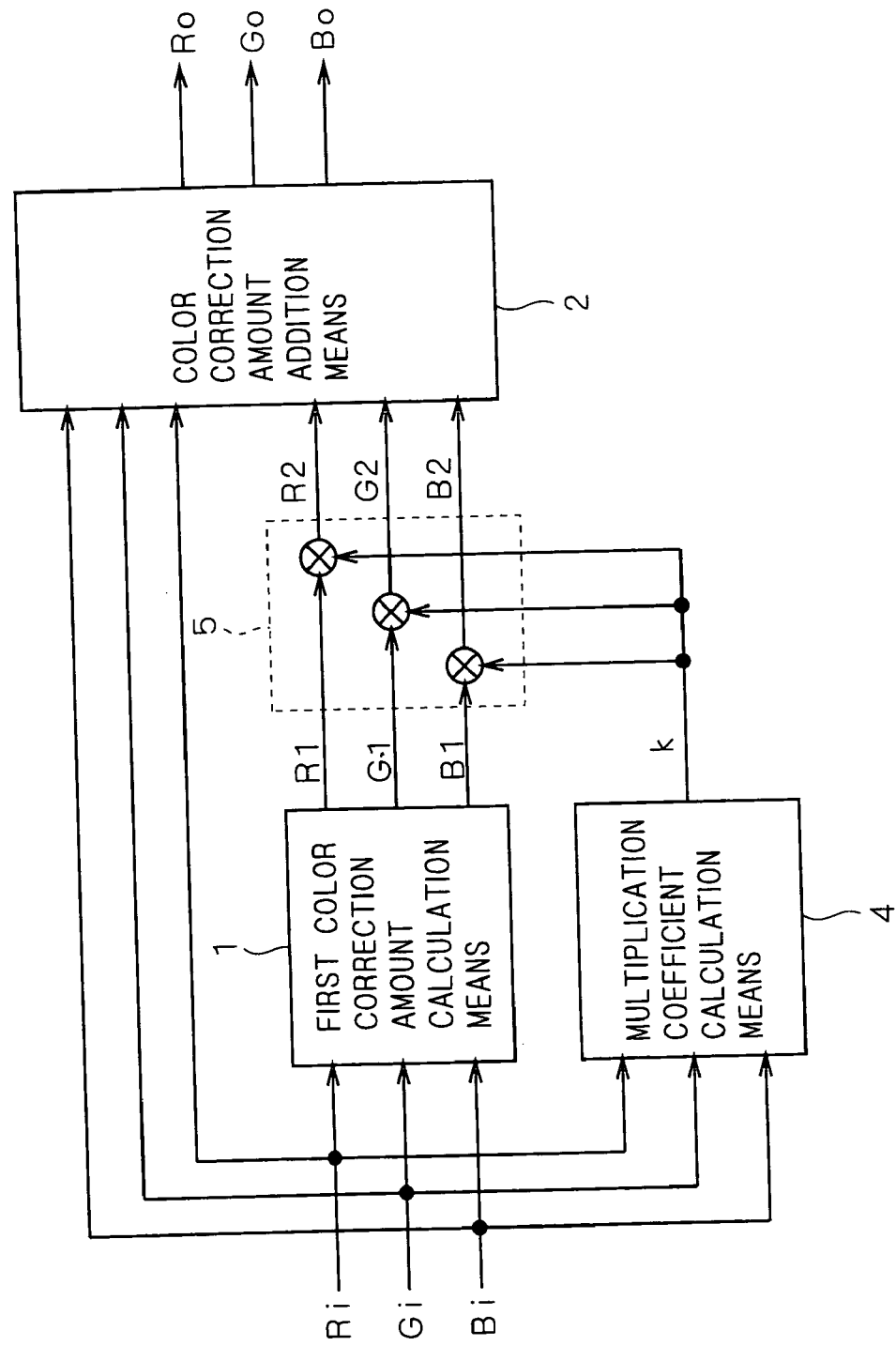
FIG. 1 is a block diagram showing one example of a configuration of a color converter according to embodiment 1.
Figure 26:
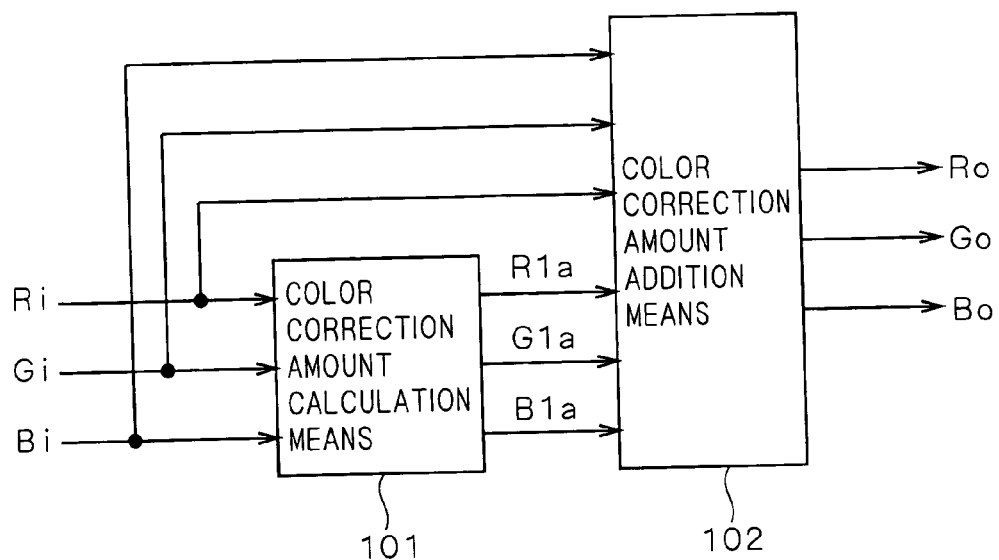
FIG. 26 is a block diagram showing a configuration of a color converter in a conventional matrix computing system.

FIG. 1 is a block diagram showing one example of a configuration of a color converter according to embodiment 1. In this Figure, reference numeral 1 is first color correction amount calculation means, 2 is color correction amount addition means, 4 is multiplication coefficient calculation means, and 5 is second color-correction calculation means. The configuration of the first color correction amount calculation means 1 will be described later, and the first color correction amount calculation means 1 and the color correction amount addition means 2 may have the same configurations as color correction amount calculation means 101 and color correction amount addition means 102 in a conventional color converter, respectively shown in FIG. 26.

First color data Ri, Gi, Bi, which are targets for color-conversion processes, are inputted to the first color correction amount calculation means 1, the color correction amount addition means 2 and the multiplication coefficient calculation means 4. In the first color correction amount calculation means 1, first color correction amounts R1, G1, B1 that correspond to the first color data Ri, Gi, Bi are calculated by linear operations shown in the following equation (9), and inputted to the second color correction amount calculation means 5.

$$\begin{bmatrix} R1 \\ G1 \\ B1 \end{bmatrix} = (A1ij) \begin{bmatrix} Ri \\ Gi \\ Bi \end{bmatrix} \quad \text{Equation (9)}$$

In this equation, A1$ij$ represents a coefficient matrix in which i=1 to 3 and j=1 to 3.

Moreover, in the multiplication coefficient calculation means 4, a multiplication coefficient k is calculated from the first color data Ri, Gi, Bi, and outputted to the second color correction amount calculation means 5. Then, in the second color correction amount calculation means 5, the first color correction amounts R1, G1, B1 are respectively multiplied by the multiplication coefficient k so that the second color correction amounts R2, G2, B2 are found, and these are outputted to the color correction amount addition means 2. The color correction amount addition means 2 adds the first color data Ri, Gi, Bi and the second color correction amounts R2, G2, B2 so as to find the second color data Ro, Go, Bo, which are output data after the color conversion. In other words, the second color data Ro, Go, Bo, outputted from the color correction amount addition means 2, are represented by the following equation (10).

$$\begin{bmatrix} Ro \\ Go \\ Bo \end{bmatrix} = \begin{bmatrix} Ri \\ Gi \\ Bi \end{bmatrix} + k \begin{bmatrix} R1 \\ G1 \\ B1 \end{bmatrix} \quad \text{Equation (10)}$$

Figure 2:
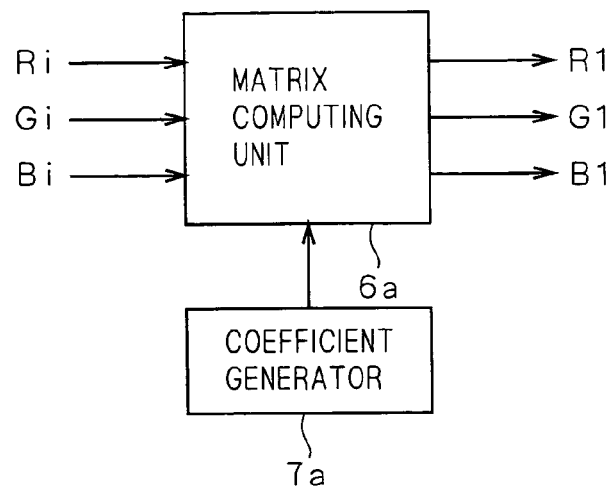
FIG. 2 is a block diagram showing one example of a configuration of first color correction amount calculation means in the color converter according to embodiment 1.

Moreover, FIG. 2 is a block diagram showing a structural example of the first color correction amount calculation means 1 shown in FIG. 1. In this Figure, reference numeral 6$a$ is a matrix computing unit and 7$a$ is a coefficient generator. The coefficient generator 7$a$ generates a coefficient A1$ij$ for matrix operations in equation (9), and sends this to the matrix computing unit 6$a$. The matrix computing unit 6$a$ calculates equation (9) by using the first color data Ri, Gi, Bi and the coefficient A1$ij$ from the coefficient generator 7$a$ to find the first color-correction data R1, G1, B1. Here, it is clear that the operation of equation (9) is easily achieved by multiplication means and addition means; therefore, the detailed description thereof will not be repeated.

Figure 3:
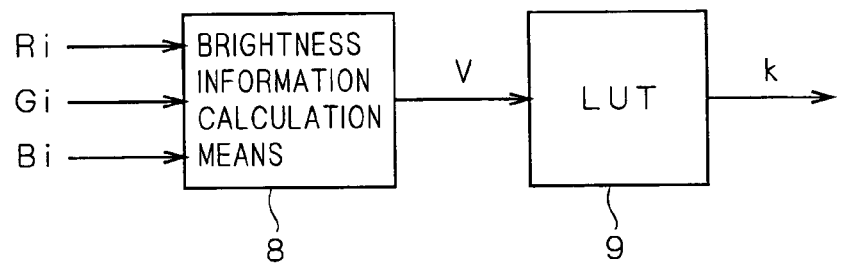
FIG. 3 is a block diagram showing one example of a configuration of multiplication coefficient calculation means in the color converter according to embodiment 1.

Moreover, FIG. 3 is a block diagram showing a structural example of the multiplication coefficient calculation means 4 shown in FIG. 1. In this Figure, reference numeral 8 is brightness information calculation means, and 9 is a look up table (LUT). The first color data Ri, Gi, Bi, inputted to the multiplication coefficient calculation means 4, are inputted to the brightness information calculation means 8. The brightness information calculation means 8 calculates brightness information V that is information for indicating brightness of the first color data, and outputs this to a look up table 9.

The look up table 9, which is constituted by a memory, etc., preliminarily stores values of the multiplication coefficient that correspond to values of the brightness information V. The look up table 9 extracts the multiplication coefficient k corresponding to the inputted value of brightness information V from a memory, and outputs the resulting value. For example, values of the multiplication coefficient k that respectively correspond to values of the brightness information V are preliminarily stored in the memory of the look up table 9 with the brightness information V being set in the form of addresses; thus, by inputting brightness information V as a readout address, the corresponding multiplication coefficient k can be outputted.

Figure 4:
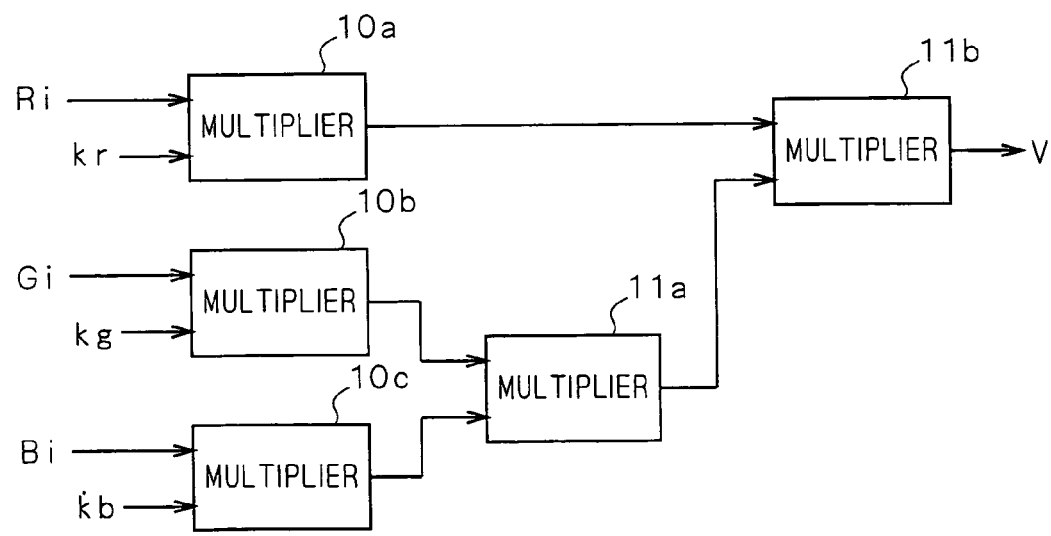
FIG. 4 is a block diagram showing one example of a configuration of brightness information calculation means in the color converter according to embodiment 1.

Here, FIG. 4 is a block diagram showing a structural example of the brightness information calculation means 8 shown in FIG. 3. In this Figure, reference numerals 10*a*, 10*b*, 10*c* are multipliers, and 11*a* and 11*b* are adders. The first color data Ri, Gi, Bi are inputted to the respective multipliers 10*a*, 10*b*, 10*c* together with predetermined coefficients kr, kg, kb, and the respective results of multiplication are outputted. The outputs from the multipliers 10*b* and 10*c* are inputted to the adder 11*a*, and the results of the addition are outputted. The output of the adder 11*a* is further inputted to the adder 11*b* together with the output of the multiplier 10*a* so that the result of the addition is outputted as brightness information V. In other words, in the brightness information calculation means 8 shown in FIG. 4, the brightness information V of the first color data is represented by the following equation (11).

$$V = kr \times Ri + kg \times Gi + kb \times Bi \quad \text{Equation (11)}$$

For example, in the case where the first color data Ri, Gi, Bi are color data in compliance with NTSC, kr=0.3, kg=0.59 and kb=0.11 are set in equation (11). Moreover, for example, supposing that kr=0.25, kg=0.5 and kb=0.25, the multipliers 10*a*, 10*b*, 10*c* may be achieved by bit shifts so that it is possible to downsize the circuit configuration.

Here, the following description will discuss the relationship between the brightness information V and the multiplication coefficient k outputted from the look up table 9. In the following description, it is assumed that the first color data Ri, Gi, Bi are integers from 0 to 255. Moreover, it is also assumed that the brightness information V is indicated by an integer from 0 to 255, and found from equation (11) with settings of kr=0.25, kg=0.5 and kb=0.25. Moreover, it is assumed that the multiplication coefficient k is given as a decimal fraction from not less than 0 to not more than 1.

As described above, in the case where the original color data components Rs, Gs, Bs in a dark portion and the like of an image are small, that is, in the case where the brightness of the color data is low, the color data are seriously susceptible to influences of noise components. Therefore, in such a case, when the color conversion process for enhancing the saturation of the color data is carried out, that is, when the process for emphasizing the color is carried out, the influences of noise components are further emphasized, with the result that, instead of improving the image, the color-conversion process causes a defective image to be displayed on an image display device. Moreover, when the original color data components Rs, Gs, Bs are small, the first color data Ri, Gi, Bi to be inputted to the device also become smaller. Therefore, in the present embodiment, it is possible to reduce the correction amount of color conversion for enhancing the saturation of the color data to a small level, when the brightness of the first color data is low (that is, when the brightness of the original color data is low).

FIG. 5 is a graph that indicates one example of the relationship between the multiplication coefficient k and brightness information V to be stored in the look up table 9. When V=0, k=0, and when V=255, k=1, and in this range, the value of the multiplication coefficient k is linearly varied with respect to the brightness information V.

In the case where the relationship between the multiplication coefficient k and the brightness information V to be stored in the look up table 9 is shown in the graph of FIG. 5, in an example shown in FIG. 24 in which the original color data are Rs=192, Gs=64, Bs=64 with noise components being set to Rn=8, Gn=8, Bn=24, the first color data are represented by Ri=200, Gi=72, Bi=88. In contrast to the original color components Rs, Gs, Bs which exhibit a red color, the first color data Ri, Gi, Bi exhibit a slightly bluish red color due to the influences of the noise components Rn, Gn, Bn. At this time, the brightness information of the first color data obtained from equation (11) is V=108, with the multiplication coefficient k=0.42 obtained from the relationship of FIG. 5.

In an example shown in FIG. 25, in which the color data are Rs=24, Gs=8, Bs=8 with noise components being set to Rn=8, Gn=8, Bn=24, the first color data are represented by Ri=32, Gi=16, Bi=32. In contrast to the original color components Rs, Gs, Bs which exhibit a red color, the first color data Ri, Gi, Bi exhibit a magenta color due to the influences of the noise components Rn, Gn, Bn, resulting in a great change in hues. At this time, the brightness information data is V=24, with the multiplication coefficient being set to k=0.09 from the relationship of FIG. 5.

In the second color correction amount calculation means 5, the first color correction amounts R1, G1, B1 are respectively multiplied by the multiplication coefficient k so that the second color correction amounts R2, G2, B2, which form final correction amounts, are calculated and obtained. Therefore, as the multiplication coefficient k becomes smaller, the correction amount by the color conversion process is reduced. Moreover, since the relationship between the multiplication coefficient k and the brightness information V is set as shown in FIG. 5, the multiplication coefficient k becomes smaller as the brightness of the first color data is reduced, as shown in the above-mentioned numerical example.

As a result, in the case where the brightness of the original color data is small, and seriously susceptible to influences of noise components, the correction amount by the color conversion process is reduced to a small level. In contrast, in the case where the brightness of the original color data is great, and less susceptible to influences of noise components, the color conversion process for emphasizing the color is carried out in a level close to the conventional level by increasing the multiplication coefficient k.

Therefore, it becomes possible to solve the problem of emphasized influences of noise components with respect to color data having low brightness due to the color conversion process for enhancing the saturation thereof, which have been caused by the color converter using the conventional matrix operation system.

Moreover, in this case, a look up table is used as the means for finding the multiplication coefficient k from the brightness information V; however, the look up table to be used here is achieved by a one-dimensional table with respect to the brightness information V. In other words, it is not necessary to provide a large capacity look up table such as a three-dimensional look up table with respect to color data R, G, B used in the conventional table conversion system.

Therefore, it is possible to solve the problem of difficulty in applying LSIs and the problem of difficulty in flexibly changing conversion characteristics due to the necessity of a large capacity memory, which have been caused by the color converter using the conventional table conversion system.

In FIG. 5, the relationship between the brightness information V and the multiplication coefficient k is a proportional relationship; however, in the present embodiment, the relationship of the two elements is not limited to this relationship, and any relationship which makes the multiplication coefficient k small when the value of the brightness information V is small may be used with the same effects.

For example, FIG. 6 is a graph that shows another example of the relationship between the multiplication coefficient k and the brightness information V to be stored in the look up table 9. In the case where the brightness of the first color data is low and seriously susceptible to the influences of noise components (in the case of brightness information V<30), the multiplication coefficient k=0 is set so that no color emphasizing process is carried out in the color-conversion process. In contrast, in the case where the brightness of the first color data is high, and less susceptible to the influences of noise components (in the case of brightness information V>122), the value of the multiplication coefficient k is set to 1, and the color emphasizing process is carried out by the color-conversion process in the same manner as the conventional process. Moreover, in the range of brightness information 30<V<122, as shown in the same Figure, the value of the multiplication coefficient k is linearly varied with respect to the brightness information V.

Here, in the case of the first color data, Ri=200, Gi=72, Bi=88, the brightness information V=108 and the multiplication coefficient k=0.85 so that the relationship between the multiplication coefficient k and the brightness information V allows the color emphasizing operation by the color-conversion process to be more effectively carried out in comparison with the case shown in FIG. 5. Moreover, in the case of Ri=32, Gi=16, Bi=32, the brightness information V=24 and the multiplication coefficient k=0 so that no color emphasizing process is carried out.

In other words, in the case of the relationship of the brightness information V and the multiplication coefficient k shown in FIG. 5, it is possible to reduce the influences of noise components generally from a small level to a great level of the brightness information V; however, the effects of emphasizing the saturation becomes smaller as a whole. In contrast, in the case of FIG. 6, when the brightness information V is small, the effects of reducing the noise components are particularly exerted greatly, and when the brightness information is great, the effects of emphasizing the saturation are exerted greatly.

Moreover, in the present embodiment, the look up table is used as the means for finding the corresponding multiplication coefficient k from the brightness information V; however, this means may be formed by using arithmetic circuits and the like. However, the arrangement using the look up table has an advantage that is not achieved by arithmetic circuits, in that various characteristics are easily achieved by rewriting the contents of the table without changing the circuit configuration.

As described above, in accordance with the color converter and color converting method according to the present embodiment, in the case where the process for enhancing the saturation of color data is carried out, without the necessity of using any large capacity memory, it is possible to achieve superior color reproduction without further emphasizing the influences of noise components even in color data that have low brightness and tend to have adverse effects from the noise components.

Moreover, in the present embodiment, as shown in FIG. 4 and equation (11), the first color data Ri, Gi, Bi are respectively multiplied by predetermined coefficients, and the sum of the resulting values is found so that the brightness information V is calculated. In the human sensitivities, the brightness is recognized differently depending on colors due to visual sensitivity characteristics. For example, even in the case of the same signal level, a green color is felt brighter, and a blue color is felt darker. Therefore, by defining the brightness information as shown in equation (11), it is possible to calculate and find the brightness information V that is close to human sensitivity.

Moreover, since the second color correction amount is obtained by multiplying the first color correction amount by the multiplication coefficient k, it is only necessary to use the multiplication coefficient k as the data for finding the color correction amount (second color correction amount) corresponding to the brightness information of the first color data. For example, in the conventional color converter shown in FIG. 26, it is proposed that the color correction amounts R1a, G1a, B1a are calculated in association with the brightness information of the first color data Ri, Gi, Bi. However, as described above, in the arrangement of FIG. 26, since the color correction amounts R1a, G1a, B1a are found on the basis of equation (3), it is necessary to calculate the coefficient matrix (A1$ij$) corresponding to each of the first color data in association with the brightness information of the first color data in order to allow the color correction amounts to correspond to the first color data. In other words, since i=1 to 3 and j=1 to 3 in equation (3), the total 9 coefficient data need to be calculated. For this reason, the present embodiment has an advantage in that it is possible to reduce the amount of data to be calculated in order to obtain the color correction amount (second color correction amount) in association with the brightness information of the first color data.

Moreover, the present embodiment has been described on the premise that a hardware configuration is adopted; however, the sequence of the color-conversion processes shown in the present embodiment may be achieved on a software basis.

Furthermore, in the above-mentioned embodiment, the first color data are constituted by three components representing red, green and blue; however, the present invention is easily applicable to a case in which the first color data are constituted by not less than four colors, with the same effects. In this case, the brightness information V is found from color data on the basis of the components of not less than four colors.

2. Embodiment 2

In embodiment 1, the multiplication coefficient calculation means 4 is provided with the brightness information calculation means 8, and the brightness information calculation means 8 calculates the brightness information V from the first color data Ri, Gi, Bi. However, in the case where the brightness information V of the first color data is preliminarily known, it is not necessary for the multiplication coefficient calculation means 4 to calculate the brightness information from the first color data, and the multiplication coefficient k may be obtained from the brightness information V that has been preliminarily known.

For example, in the case of a television signal, a video signal and the like, the image signal is sometimes constituted by not signals of R, G, B, but a luminance signal and a color-difference signal. In such a case, for example, in the case where the inputs of the color converter are set to signals of R, G, B, after the first color data Ri, Gi, Bi have been calculated from the luminance signal and the color-difference signal, the resulting data need to be inputted. However, the luminance signal, as it is, may be used as the brightness information V. Therefore, in this case, the multiplication coefficient calculation means 4 need not be provided with the brightness information calculation means 8, and the multiplication coefficient k may be calculated from the brightness information V (luminance signal) inputted to the device.

Figure 7:
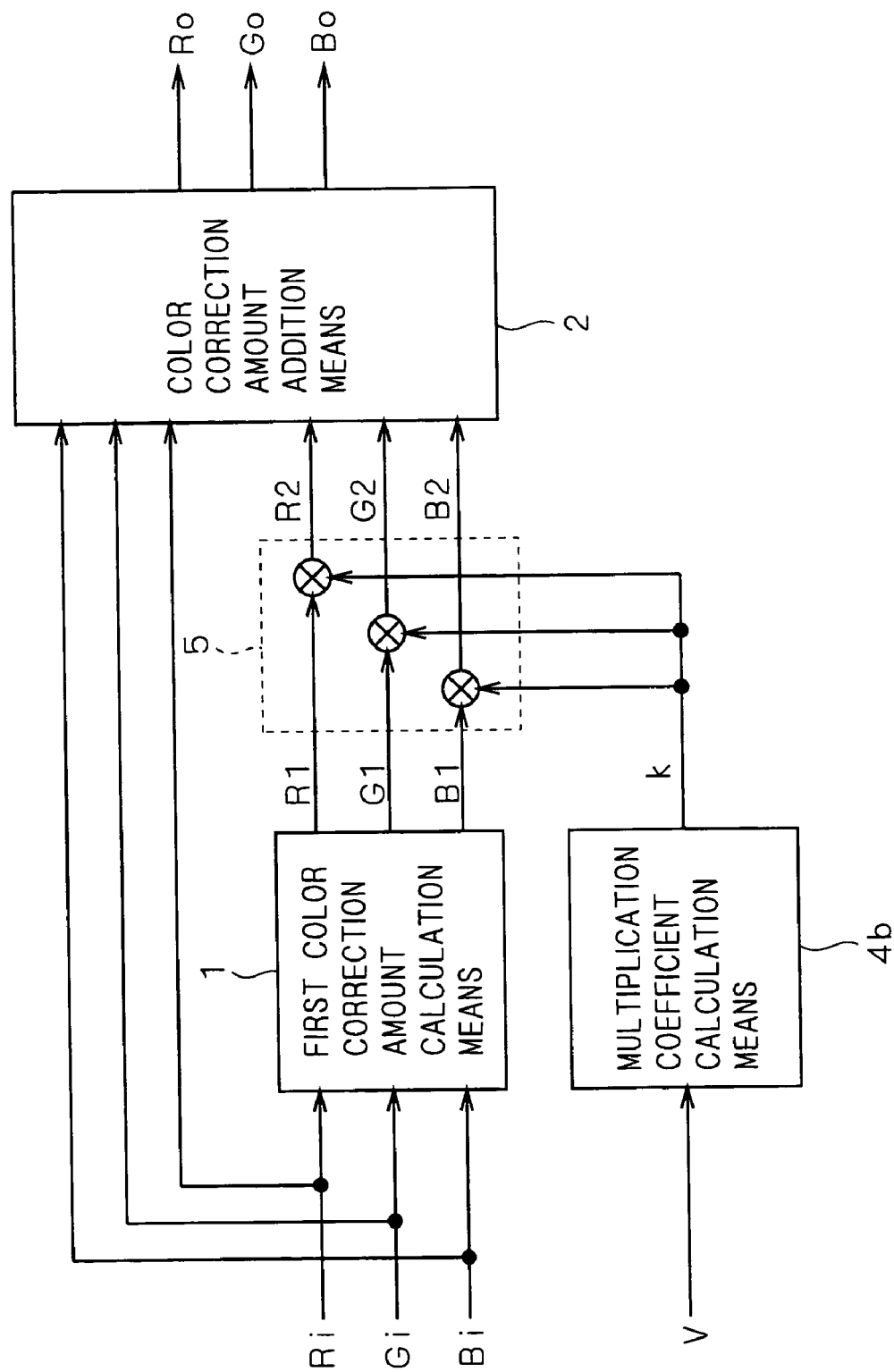
FIG. 7 is a block diagram showing one example of a configuration of a color converter according to embodiment 2.

FIG. 7 is a block diagram showing one example of a configuration of a color converter according to embodiment 2 of the present invention. In this Figure, those elements that are the same as those of FIG. 1 are indicated by the same reference numbers, and the description thereof will not be repeated. Here, reference numeral 4b represents multiplication coefficient calculation means in the present embodiment.

The brightness information V is inputted to the multiplication coefficient calculation means 4b, and a multiplication coefficient k corresponding to the value is outputted. The multiplication coefficient calculation means 4b may be formed as a look up table in which values of the multiplication coefficient k corresponding to the respective values of the brightness information V have been preliminarily stored as addresses for the brightness information V. Moreover, this may be constituted by arithmetic circuits.

As described above, in the case where the brightness information V of the first color data Ri, Gi, Bi have been preliminarily known, it is not necessary for the multiplication coefficient calculation means 4a to have the brightness information calculation means; thus, it is possible to simplify the circuit configuration and processes.

3. Embodiment 3

Figure 8:
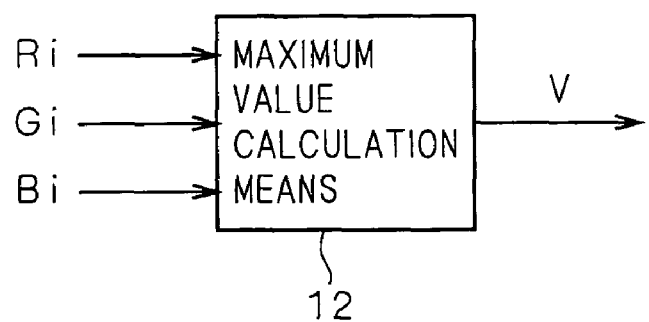
FIG. 8 is a block diagram showing one example of a configuration of brightness information calculation means in a color converter according to embodiment 3.

FIG. 8 is a block diagram showing one example of a configuration of brightness information calculation means 8 in a color converter according to embodiment 3 of the present invention. As shown in this Figure, the brightness information calculation means 8 is formed by maximum value calculation means 12. Here, the other structures except for the brightness information calculation means 8 of the color converter according to the present embodiment are the same as those of embodiment 1; therefore, the detailed description thereof will not be repeated.

The first color data Ri, Gi, Bi, inputted to the brightness information calculation means 8, are inputted to the maximum value calculation means 12, and the maximum value of Ri, Gi, Bi is outputted as the brightness information V. In other words, in the present embodiment, the brightness information is defined as V=MAX (Ri, Gi, Bi).

In embodiment 1, the respective values of the first color data are multiplied by predetermined coefficients, and by finding the sum of these values, the brightness information V is calculated in a manner so as to become close to human sensitivity (equation (11)). However, noise components contained in the first color data are generated irrespective of the human sensitivity, and the influences of the noise components in the first color data are varied on the basis of the relative relationship of sizes between the original color data components Rs, Gs, Bs and the noise components Rn, Gn, Bn.

For example, in both of the cases in which noise components Rn=20, Gn=20, Bn=40 are added to the original color data components Rs=200, Gs=50, Bs=50, and in which noise components Rn=20, Gn=20, Bn=40 are added to the original color data components Rs=50, Gs=200, Bs=50, the influences of the noise components are the same in a color data space. However, the brightness information calculated by the brightness information calculation means in embodiment 1 is different between these two cases. In contrast, in the present embodiment, the brightness information calculated in the brightness information calculation means forms the same value, that is, V=220, in both of the two cases. This fact indicates that in the color converter in the present embodiment, the susceptibility of the brightness information to the influences of the noise components in the first color data is correctly represented in the color data space.

The degree of the influences of the noise components in the first color data is considered to be mainly dependent on the maximum value of the color data components; therefore, even when the multiplication coefficient k is found by using the brightness information V=MAX (Ri, Gi, Bi), it is possible to obtain the same effects as embodiment 1.

Moreover, different from the calculation method of the brightness information by the use of equation (11), the calculation of the brightness information V=MAX (Ri, Gi, Bi) requires no multiplying processes. In general, multiplying processes impose a great operation load, and in particular, in the case of a hardware configuration, a very large circuit scale is required. Therefore, it is very important to eliminate multiplying processes in the calculation of the brightness information, and this makes it possible to reduce the operation load in the brightness information calculation means in the color converter, and also to cut the circuit scale.

4. Embodiment 4

Figure 9:
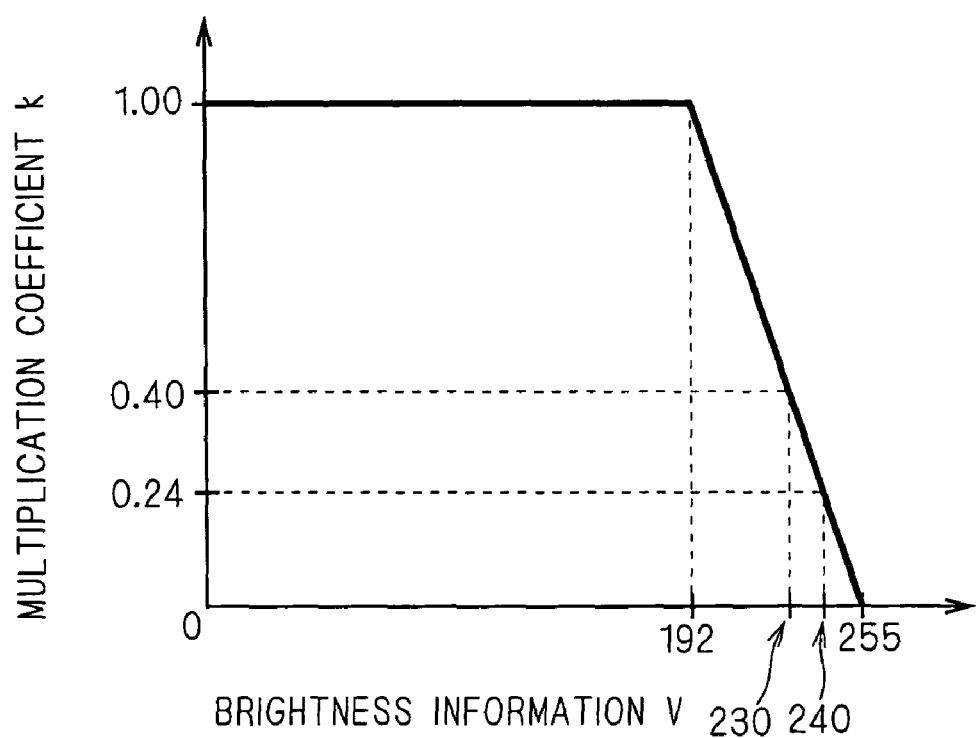
FIG. 9 is a graph showing one example of the relationship between multiplication coefficient k and brightness information V to be stored in a look up table in a color converter according to embodiment 4.

The application of the arrangement shown in FIGS. 1 or 7 makes it possible to reduce the generation of damaged color in bright colors by altering the relationship between the multiplication coefficient k and the brightness information V. FIG. 9 is a graph that indicates one example of the relationship between the multiplication coefficient k and brightness information V to be stored in the look up table 9 in a color converter according to embodiment 4 of the present invention. In the following description, except for the relationship between the multiplication coefficient k and the brightness information V, the other arrangements of the color converter of the present embodiment are the same as those of embodiment 3 (FIGS. 1 and 8).

In the first color correction amount calculation means 1, the first color correction amounts R1, G1, B1 are calculated by operations represented by the following equation (12):

$$\begin{bmatrix} R1 \\ G1 \\ B1 \end{bmatrix} = (A1ij) \begin{bmatrix} Ri \\ Gi \\ Bi \end{bmatrix} \qquad \text{Equation (12)}$$

In equation (12), the coefficient matrix $A1ij$ has a coefficient represented by the following equation (13):

$$(A1ij) = \begin{bmatrix} 0.2 & -0.1 & -0.1 \\ -0.1 & 0.2 & -0.1 \\ -0.1 & -0.1 & 0.2 \end{bmatrix} \qquad \text{Equation (13)}$$

In this case, suppose that data having high brightness, such as Ri=230, Gi=20, Bi=20, are inputted as the first color data. In this case, the brightness information V is 230, and the multiplication coefficient k is 0.4 from FIG. 9. Moreover, the first color correction amount is represented by R1=42, G1=−21, B1=−21. Here, one decimal is rounded to the nearest whole number. Therefore, the second color data, which are the outputs of the color converter, are represented by Ro=247, Go=12, Bo=12.

Here, suppose that data, Ri=240, Gi=15, Bi=15, are inputted as the first color data. In this case, the brightness information V is 240, and the multiplication coefficient k is 0.24 from FIG. 9. Moreover, R1=45, G1=−23 and B1=−23 are obtained. Therefore, the second color data are represented by Ro=251, Go=9, Bo=9.

As described above, in the conventional color converter, the values of Ro, Go, Bo obtained when Ri=230, Gi=20, Bi=20 are inputted as the first color data become the same as the values of Ro, Go, Bo obtained when Ri=240, Gi=15, Bi=15 are inputted as color data, resulting in damaged color. In contrast, it is confirmed that the color converter of the present embodiment causes no damaged color.

In the present embodiment, the maximum value of the first color data Ri, Gi, Bi is used as the brightness information V; however, not limited to this method, the method for calculating the brightness information V may be carried out by using equation (11) as described in, for example, embodiment 1.

Moreover, in this case, a look up table is used as the means for finding the multiplication coefficient k from the brightness information V; however, the look up table to be used here is achieved by a one-dimensional table with respect to the brightness information V. In other words, it is not necessary to provide a large capacity look up table such as a three-dimensional look up table with respect to color data R, G, B used in the conventional table conversion system.

Here, the means for finding the corresponding multiplication coefficient k from the brightness information V may be constituted by arithmetic circuits or the like. However, the arrangement using the look up table has an advantage that is not achieved by arithmetic circuits, in that various characteristics are easily achieved by rewriting the contents of the table without changing the circuit configuration.

As described above, in accordance with the color converter and color converting method according to the present embodiment, in the case where the process for enhancing the saturation of color data is carried out, without the necessity of using any large capacity memory, it is possible to reduce the generation of damaged color in color data having high brightness.

Here, the relationship between the brightness information V and the multiplication coefficient k is not limited to the relationship shown in FIG. 9, and any relationship which makes the multiplication coefficient k small when the value of the brightness information V is great may be used with the same effects.

Moreover, the present embodiment has been described on the premise that a hardware configuration is adopted; however, the sequence of the color-conversion processes shown in the present embodiment may be achieved on a software basis.

Furthermore, in the above-mentioned embodiment, the first color data are constituted by three components representing red, green and blue; however, the present invention is easily applicable to a case in which the first color data are constituted by not less than four colors, with the same effects. In this case, the brightness information V is found from color data on the basis of the components of not less than four colors.

5. Embodiment 5

Figure 10:
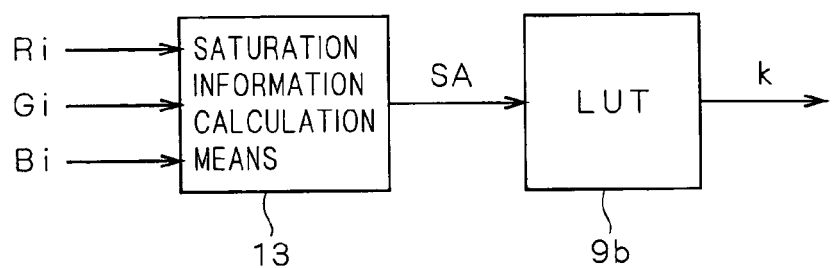
FIG. 10 is a block diagram showing one example of a configuration of multiplication coefficient calculation means in a color converter according to embodiment 5.

FIG. 10 is a block diagram showing one structural example multiplication coefficient calculation means 4 in a color converter according to embodiment 5 of the present invention. As shown in this Figure, reference numeral 13 is saturation information calculation means, and 9b is a look up table (LUT). Here, the other structures except for the saturation information calculation means 4 are the same as those of embodiment 1 (FIG. 1); therefore, the detailed description thereof will not be repeated. In embodiment 1, the multiplication coefficient k is calculated by using brightness information as characteristic information of the first color data Ri, Gi, Bi; however, in the color converter according to the present embodiment, the multiplication coefficient k is calculated by using saturation information as characteristic information of the first color data Ri, Gi, Bi.

The first color data Ri, Gi, Bi, inputted to the multiplication coefficient calculation means 4, is inputted to the saturation information calculation means 13. The saturation information calculation means 13 calculates saturation information SA that is information representing the saturation of the first color data Ri, Gi, Bi, and outputs this to the look up table 9b.

The look up table 9b is formed by a memory and the like, and values of the multiplication coefficient k corresponding to the values of the saturation information SA are preliminarily stored therein. The look up table 9b extracts a multiplication coefficient k corresponding to the value of inputted saturation information SA from the memory, and outputs the resulting value. For example, values of the multiplication coefficient k that respectively correspond to values of the saturation information SA are preliminarily stored in the memory of the look up table 9b with the saturation information SA being set in the form of addresses; thus, by inputting saturation information SA as a readout address, the corresponding multiplication coefficient k can be outputted.

In the second color correction amount calculation means 5, each of the first color correction amounts R1, G1, B1 is multiplied by the multiplication coefficient k outputted from the look up table 9b of the multiplication coefficient calculation means 4 so that the second color correction amounts R2, G2, B2 are calculated. Then, the second color correction amounts R2, G2, B2 are respectively added to the first color data Ri, Gi, Bi by the color correction amount addition means 2 so that the second color data Ro, Go, Bo are calculated.

Figure 11:
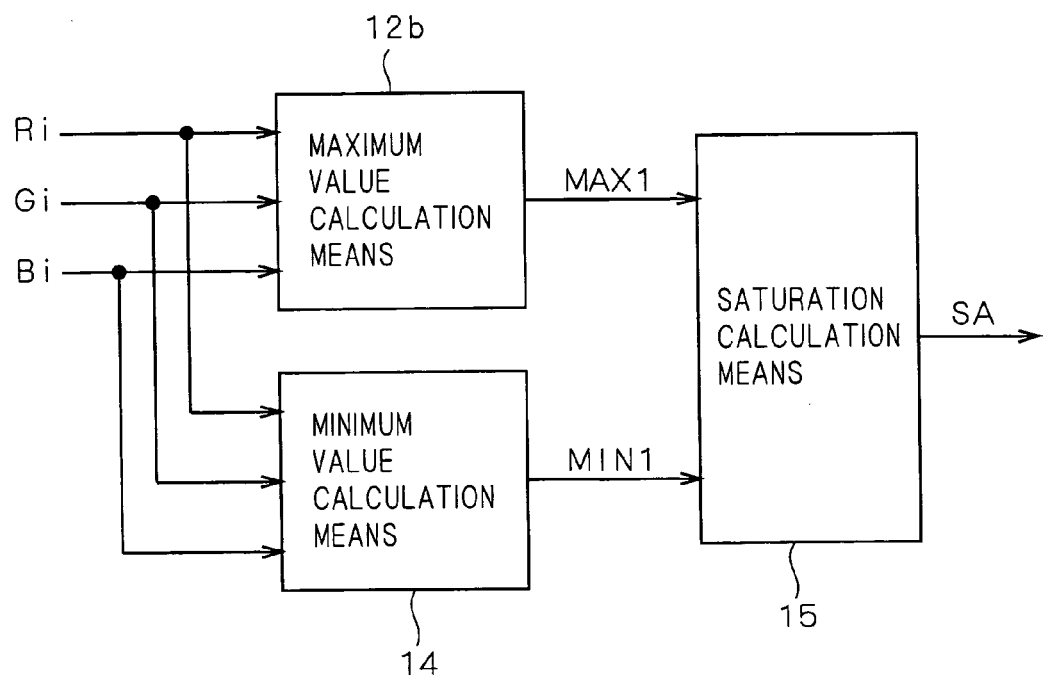
FIG. 11 is a block diagram showing one example of a configuration of saturation information calculation means in the color converter according to embodiment 5.

FIG. 11 is a block diagram showing one structural example of saturation information calculation means 13 shown in FIG. 10. In this Figure, reference numeral 12b is maximum value calculation means, 14 is minimum value calculation means and 15 is saturation operation means. The first color data Ri, Gi, Bi are inputted to the maximum value calculation means 12b and the minimum value calculation means 14. The maximum value calculation means 12b calculates the maximum value MAX1 of the first color data Ri, Gi, Bi, and outputs this to the saturation calculation means 15. The minimum value calculation means 14 calculates the minimum value MIN1 of the first color data Ri, Gi, Bi, and outputs the resulting value to the saturation operation means 15. On the basis of the inputted maximum value MAX1 and minimum value MIN1, the saturation operation means 15 calculates saturation information SA represented by the following equation (14) derived from equation (5).

$$SA=(MAX1-MIN1)/MAX1 \quad \text{Equation (14)}$$

For example, in the case of Ri=255, Gi=0, Bi=0 in the first color data, saturation information SA=1.0 is obtained, and in the case of Ri=128, Gi=64, Bi=64 in the first color data, saturation information SA=0.5 is obtained.

The following description will discuss the relationship between the multiplication coefficient k and the saturation information SA to be stored in the look up table 9$b$ in the present embodiment and the effects thereof. Here, in the following description also, it is assumed that the first and second color data are represented by integers in a range from 0 to 255, and that first decimal is rounded to the nearest whole number.

FIG. 12 is a graph that shows one example of the relationship between the multiplication coefficient k and the saturation information SA to be stored in the look up table 9$b$. In a range from SA=0 to SA=0.3, the multiplication coefficient is set to k=1.0. Moreover, when SA=1.0, k=0.0, and in a range from SA=0.3 to SA=1.0, k is varied linearly with respect to SA.

In the first color correction amount calculation means 1, the first color correction amounts R1, G1, B1 are calculated through operations represented by the following equation (15).

$$\begin{bmatrix} R1 \\ G1 \\ B1 \end{bmatrix} = (A1ij) \begin{bmatrix} Ri \\ Gi \\ Bi \end{bmatrix} \quad \text{Equation (15)}$$

Moreover, in equation (15), the coefficient matrix A1$ij$ has a coefficient represented by the following equation (16):

$$(A1ij) = \begin{bmatrix} 0.2 & -0.2 & -0.2 \\ -0.2 & 0.2 & -0.2 \\ -0.2 & -0.2 & 0.2 \end{bmatrix} \quad \text{Equation (16)}$$

For example, suppose that Ri=255, Gi=128, Bi=128, are inputted as the first color data. In this case, the saturation Sati of the first color data is 0.5, and the multiplication coefficient k is 0.72 from FIG. 12. Moreover, from equations (15) and (16), the first correction amounts are set to R1=0, G1=−51, B1=−51. Therefore, from equation (9), the second color data, which are outputs of the color converter, are set to Ro=255, Go=91, Bo=91. The saturation Sato of the second color data is 0.64; thus, it is confirmed that the saturation of the color data is made higher by the color conversion processes.

Here, suppose that color data having high saturation, such as Ri=255, Gi=26, Bi=26, are inputted as the first color data. In this case, the saturation Sati of the first color data is 0.9, and the multiplication coefficient k is 0.14. Moreover, the first correction amounts are represented by R1=41, G1=−51, B1=−51. Therefore, the second color data are represented by Ro=255, Go=19, Bo=19. The saturation Sato of the second color data is 0.93.

Here, suppose that data, Ri=255, Gi=51, Bi=51, are inputted as the first color data. In this case, the saturation Sati of the first color data is 0.8, and the multiplication coefficient k is 0.29. Moreover, the first correction amounts are represented by R1=31, G1=−51 and B1=−51. Therefore, the second color data are represented by Ro=255, Go=36, Bo=36. The saturation Sato of the second color data is 0.86.

As described above, in the conventional color converter, the values of Ro, Go, Bo of the second color data, obtained when Ri=255, Gi=26, Bi=26 are inputted as the first color data, become the same as the values of Ro, Go, Bo of the second color data obtained when Ri=255, Gi=51, Bi=51 are inputted as the first color data, resulting in damaged color. In contrast, it is confirmed that the color converter of the present embodiment causes no damaged color.

Here, the relationship between the saturation information SA and the multiplication coefficient k is not limited to the relationship shown in FIG. 12, and any relationship which makes the multiplication coefficient k small when the value of the saturation information SA is great may be used with the same effects.

FIG. 13 is a graph that shows another example of the relationship between the multiplication coefficient k and the saturation information SA to be stored in the look up table 9$b$. In a range of the saturation information from SA=0 to SA=0.7, k=1.0 is set, and when SA=1.0, k=0.0 is set. Moreover, in a range from SA=0.7 to SA=1.0, the value of the multiplication coefficient k is varied linearly with respect to the saturation information SA.

In this case also, descriptions are given of the above-mentioned examples in the same manner. First, when Ri=255, Gi=128, Bi=128, are inputted as the first color data, the saturation Sati of the first color data is 0.5, and the multiplication coefficient k is 1.0 from FIG. 13. Moreover, since the first correction amounts are set to R1=0, G1=−51, B1=−51, the second color data are set to Ro=255, Go=77, Bo=77. The saturation Sato of the second color data is 0.70; thus, it is confirmed that the saturation of the color data is made higher by the color conversion processes.

Next, when data, Ri=255, Gi=26, Bi=26, are inputted as the first color data, the saturation Sati of the first color data is 0.9, and the multiplication coefficient k is 0.34. Moreover, since the first correction amounts are represented by Ri=41, Gi=−51 and Bi=−51, the second color data are represented by Ro=255, Go=9, Bo=9. The saturation Sato of the second color data is 0.96.

Moreover, when data, Ri=255, Gi=51, Bi=51, are inputted as the first color data, the saturation Sati of the first color data is 0.8, and the multiplication coefficient k is 0.67. Moreover, since the first correction amounts are represented by R1=31, G1=−51 and B1=−51, the second color data are represented by Ro=255, Go=17, Bo=17. The saturation Sato of the second color data is 0.93.

In this case also, the values of the second color data Ro, Go, Bo are different between cases in which the first color data are set to Ri=255, Gi=26, Bi=26, and in which these are set to Ri=255, Gi=51, Bi=51, causing no color damage.

As clearly indicated by the above-mentioned examples, when comparison is made between cases in which the relationship of the multiplication coefficient k and the saturation information SA is shown by FIG. 12 and in which the relationship is shown by FIG. 13, the case of FIG. 12 has greater effects for preventing damaged color in the case of high saturation in the first color data; however, it has smaller effects for emphasizing the saturation in the color conversion as a whole. In contrast, the case of FIG. 13 has comparatively smaller effects for preventing damaged color; however, it has greater effects for emphasizing the saturation.

Moreover, in this case, a look up table is used as the means for finding the multiplication coefficient k from the saturation information SA; however, the look up table to be used here is achieved by a one-dimensional table with respect to the saturation information SA. In other words, it is not necessary to provide a large capacity look up table such as a three-dimensional look up table with respect to color data R, G, B used in the conventional table conversion system.

Moreover, in the present embodiment, the look up table is used as the means for finding the corresponding multiplication coefficient k from the saturation information SA; however, this means may be formed by using arithmetic circuits and the like. However, the arrangement using the look up table has an advantage that is not achieved by arithmetic circuits, in that various characteristics are easily achieved by rewriting the contents of the table without changing the circuit configuration.

As described above, in accordance with the color converter and color converting method according to the present embodiment, in the case where the process for enhancing the saturation of color data is carried out, without the necessity of using any large capacity memory, it is possible to reduce the generation of damaged color in color data having high saturation.

Moreover, the present embodiment has been described on the premise that a hardware configuration is adopted; however, the sequence of the color-conversion processes shown in the present embodiment may be achieved on a software basis.

Furthermore, in the above-mentioned embodiment, the first color data are constituted by three components representing red, green and blue; however, the present invention is easily applicable to a case in which the first color data are constituted by not less than four colors, with the same effects. In this case, the saturation information SA is found from color data on the basis of the components of not less than four colors.

In addition, in the present embodiment, the saturation information SA is found through operations on the basis of the above-mentioned equation (14); however, the saturation information SA may be found through other operations by using the maximum value MAX1 and the minimum value MIN1 of the first color data Ri, Gi, Bi. It is clear that, for example, even when the saturation information is defined as SA=MAX1−MIN1, the same effects can be obtained, and in this case, since the saturation information SA can be calculated by using only subtracting processes, it is possible to greatly reduce the operation amounts, and also to cut the scale of arithmetic circuits for calculating the saturation information SA.

Here, in the present embodiment, the multiplication coefficient calculation means 4 is provided with the saturation information calculation means 13, and the brightness information V is calculated from the first color data Ri, Gi, Bi in the saturation information calculation means 13. However, in the case where the saturation information SA of the first color data has been preliminarily known, the saturation information SA inputted through an external device may be directly inputted to the look up table 9b so that the multiplication coefficient k is calculated. In this case, in an attempt to simplify the circuit configuration and processes, the multiplication coefficient calculation means 4 may be designed so as not to include the saturation information calculation means 13.

6. Embodiment 6

Embodiment 6 will discuss one example of a first color correction amount calculation means in a color conversion circuit in the present invention. First, the following description will discuss a basic equation used for obtaining first color correction amounts R1, G1, B1 in the first color correction amount calculation means according to the present embodiment.

Here, suppose that the first color data components to be inputted to the first color correction amount calculation means are Ri, Gi, Bi that are signals respectively representing red, green and blue, and that the minimum value is $\alpha$=MIN(Ri, Gi, Bi) and the maximum value is $\beta$=MAX(Ri, Gi, Bi). In this case, six hue data r, g, b, y, m, c, relating to red, green, blue, yellow, magenta, cyan are respectively represented by r=Ri−$\alpha$, g=Gi−$\alpha$, b=Bi−$\alpha$ and y=$\beta$−Bi, m=$\beta$−Gi, c=$\beta$−Ri.

FIGS. 14(A) to 14(F) respectively show schematic relationships among the above-mentioned six hues and color hue data y, m, c, r, g, b. As shown in these Figures, the respective hue data are respectively associated with three hues.

Here, with respect to first operation terms, the following terms are defined: h1r=MIN (y, m), h1y=MIN (r, g), h1g=MIN (c, y), h1c=MIN (g, b), h1b=MIN (m, c) and h1m=MIN (b, r). On the basis of the relationship shown in FIG. 14, relationships between these first operation terms h1r, h1y, h1g, h1c, h1b, h1m and the above-mentioned six hues are schematically shown as FIGS. 15 (A) to 15(F). These Figures show that each of the first terms is related to only the specific one hue.

Moreover, with respect to second operation terms, the following terms are defined: h2ry=MIN(aq1×h1y, ap1×h1r), h2gy=MIN(aq3×h1y, ap3×h1g), h2gc=MIN(aq4×h1c, ap4×h1g), h2bc=MIN (aq6×h1c, ap6×h1b), h2bm=MIN(aq5×h1m, ap5×h1b) and h2rm=MIN(aq2×h1m, ap2×h1r). In the respective terms, aq1 to aq6 and ap1 to ap6 are predetermined operation coefficients.

First, for convenience of description, the following description is given on the assumption that all the values of the operation coefficients aq1 to aq6 and ap1 to ap6 are set to 1. In this case, second operation terms are respectively defined as follows: h2ry=MIN (h1y, h1r), h2gy=MIN(h1y, h1g), h2gc=MIN(h1c, h1g), h2bc=MIN (h1c, h1b), h2bm=MIN(h1m, h1b), and h2rm=MIN(h1m, h1r). In this case, on the basis of the relationship shown in FIG. 15, relationships between these second operation terms h2ry, h2gy, h2gc, h2bc, h2bm, h2rm and the above-mentioned six hues are schematically shown as FIGS. 16(A) to 16(F). These Figures show that each of the second terms is related to only the specific intermediate area (inter-hue area) between hues. In other words, h2ry, h2gy, h2gc, h2bc, h2bm and h2rm are respectively related to a change in intermediate area between six hues, that is, red to yellow, yellow to green, green to cyan, cyan to blue, blue to magenta, and magenta to red.

Next, the following description will discuss a case in which the operation coefficients aq1 to aq6 and ap1 to ap6 in the second operation terms have respective predetermined values. FIGS. 17(A) to 17(F) are diagrams that schematically show the relationships between six hues and the second operation terms in the case where the values of the operation coefficients aq1 to aq6 and ap1 to ap6 in the respective second operation terms hry, hrm, hgy, hgc, hbm and hbc are varied. In these Figures, broken lines a1 to a6 show cases in which aq1 to aq6 are set to values that are respectively greater than ap1 to ap6. In contrast, broken lines b1 to b6 show cases in which ap1 to ap6 are set to values that are respectively greater than aq1 to aq6. In this case also, these Figures show that each of the second terms is related to only the specific intermediate area between hues.

For example, with respect to red to yellow, only h2ry=MIN (aq1×h1y, ap1×h1r) is the effective second operation term; however, for example, in the case where a ratio of aq1 and ap1 is set to 2:1, the relationship as indicated by broken line a1 in FIG. 22(A) is prepared so that an operation term having a peak value that relates to the red side is prepared; thus, the operation term is made particularly effective in an area close to red between the hues from red to yellow. In contrast, in the case where a ratio of aq1 and ap1 is set to 1:2, the relationship as indicated by broken line b1 in FIG. 22(A) is prepared so that an operation term having a peak value that relates to the yellow side is prepared; thus, the operation term is made particularly effective in an area close to yellow between the hues from red to yellow. In the same manner, by respectively changing aq3 and ap3 in h2gy with respect to yellow to green, aq4 and ap4 in h2gc with respect to green to cyan, aq6 and ap6 in h2bc with respect to cyan to blue, aq5 and ap5 in h2bm with respect to blue to magenta, and aq2 and ap2 in h2rm with respect to magenta to red, it is possible to change particularly effective areas even at areas between the respective hues.

FIGS. 18(a) and (b) collectively show the corresponding relationships between the six hues and inter-hue areas and the effective operation terms for these. FIG. 18(a) shows the corresponding relationships between six hues and the first operation terms, and FIG. 18(b) shows the corresponding relationships between the inter-hue areas and the second operation terms.

Here, the basic equation, which is used for finding the first color correction amounts R1, G1, B1 in the first color correction amount calculation means of the color conversion circuit according to the present embodiment, is given as the following equation (17):

$$\begin{bmatrix} R1 \\ G1 \\ B1 \end{bmatrix} = (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad \text{Equation (17)}$$

Herein, Fij is a coefficient matrix with i=1 to 3 and j=1 to 13.

By setting the operation expression of the first color correction amounts to equation (17), the coefficient relating to an operation term that is effective to a hue or an area between hues to be adjusted is changed so that it becomes possible to correct only the target hue or predetermined area between hues in an independent manner.

Moreover, by changing the operation coefficients aq1 to aq6 and ap1 to ap6 respectively, it is possible to change an area which makes the respective second operation terms particularly effective in each inter-hue areas without causing any adverse effect to the other hues. In other words, it becomes possible to correct the degree of a change in the inter-hue area in an independent manner.

Therefore, it becomes possible to flexibly change the conversion characteristics in the color-conversion process by finding the first color correction amount by using the operations of equation (17).

Here, in accordance with the definition of equation (17), matrix operations need to be carried out with respect to thirteen operation terms including the first operation terms, the second operation terms and the minimum value α of the first color data. Consequently, a number of multiplying processes have to be carried out so as to realize this system. As described above, multiplying processes impose a high load, and make the circuit scale greater, in particular in, the case of a hardware configuration, resulting in a large circuit scale so as to carry out operations of equation (17).

For this reason, in the present embodiment, the operations with respect to equation (17) are carried out in a manner so as to exclude data the value of which is zero from the first operation terms and the second operation terms; thus, the first color correction amount calculation means of the present embodiment makes it possible to reduce the operation load and also to cut the circuit scale.

Figure 15:
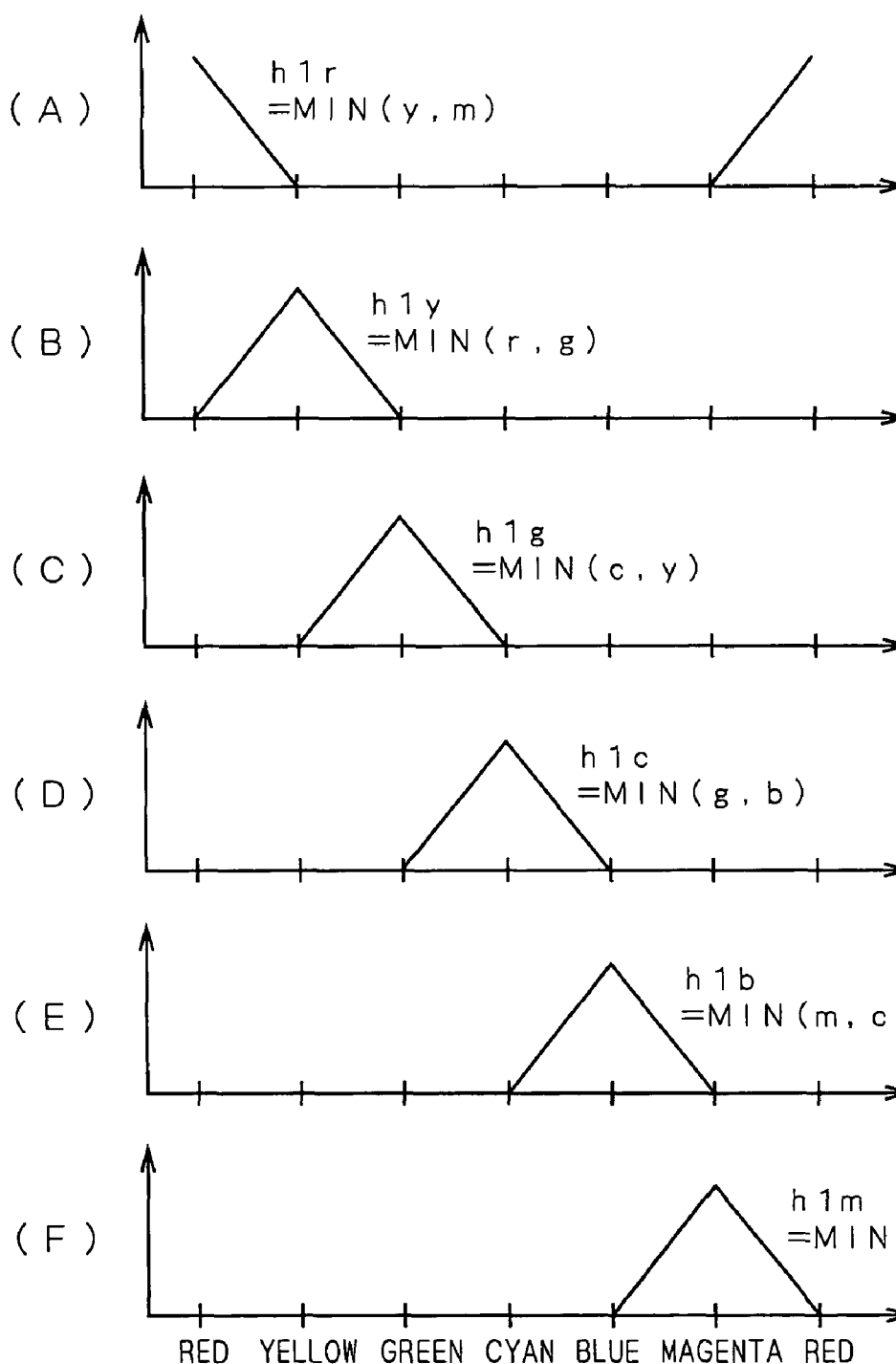
FIGS. 15(A) to 15(F) are schematic diagrams showing the relationship between first operation terms h1$r$, h1$y$, h1$g$, h1$c$, h1$b$, h1$m$ and six hues in embodiment 6.
Figure 16:
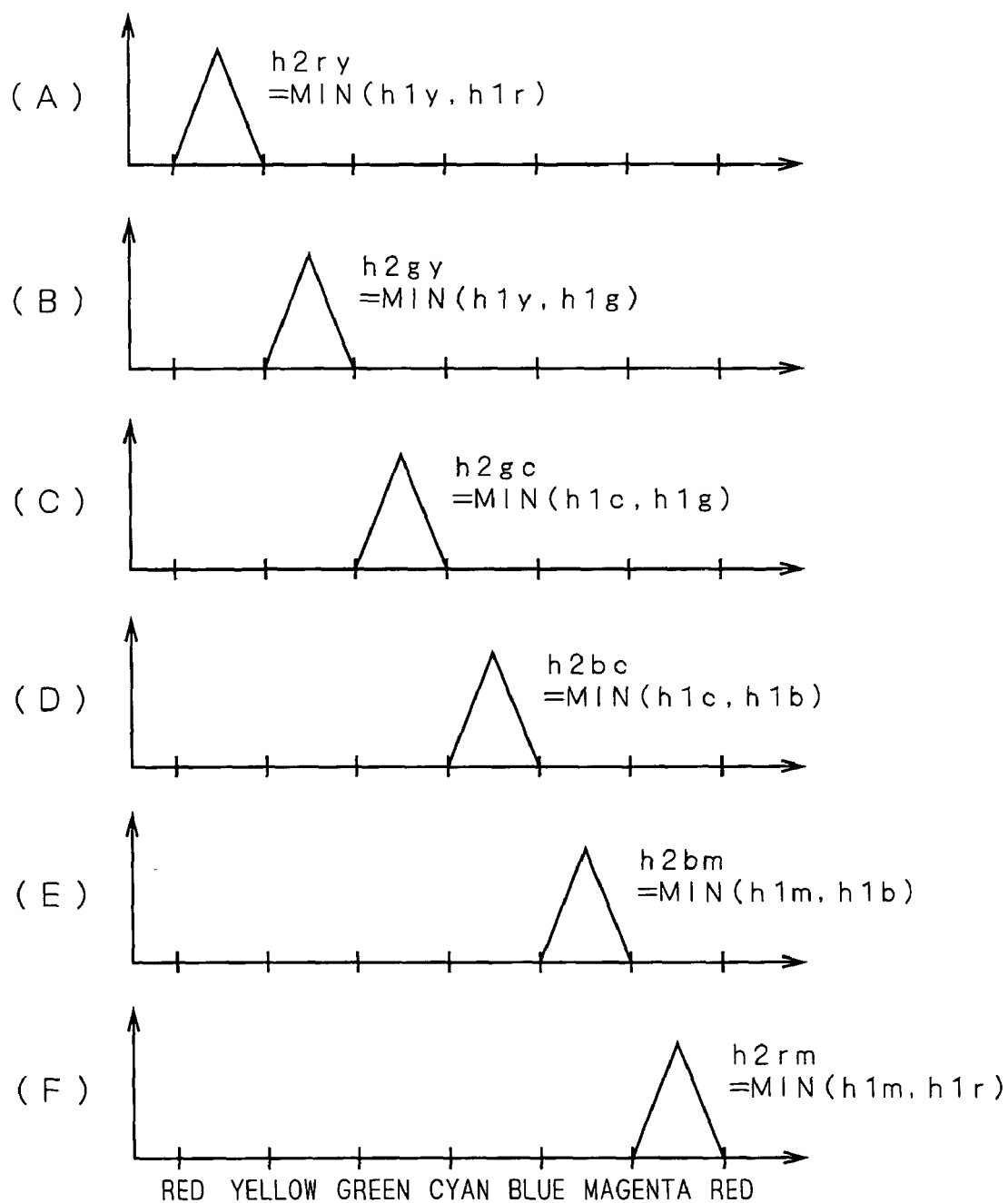
FIGS. 16(A) to 16(F) are schematic diagrams showing the relationship between second operation terms and six hues, in the case where the values of operation coefficients aq1 to aq6 and ap1 to ap6 in the second operation terms hry, hrm, hgy, hgc, hbm, hbc are all set to 1, in embodiment 6.
Figure 17:
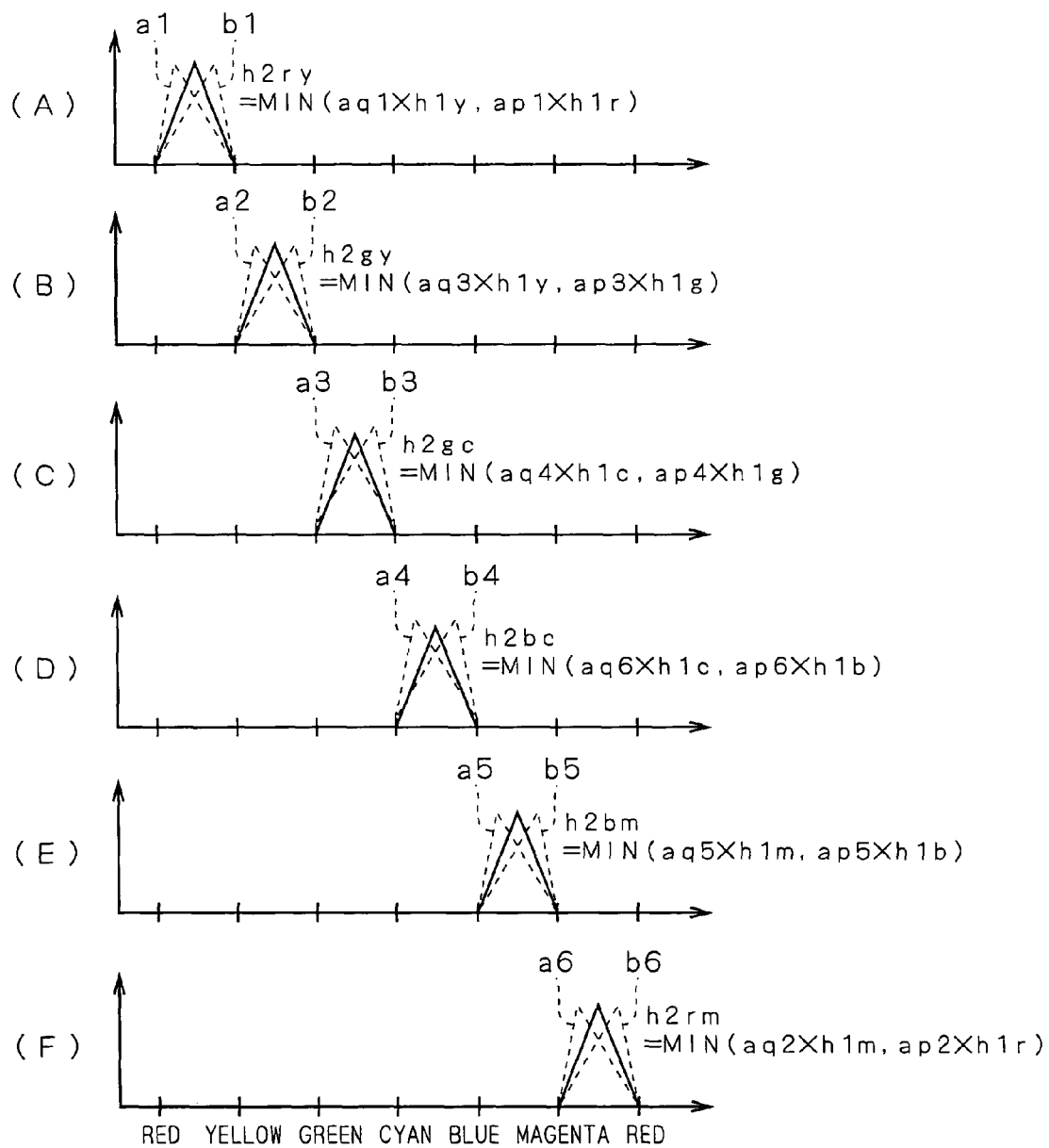
FIGS. 17(A) to 17(F) are schematic diagrams showing the relationship between second operation terms and six hues, in the case where the values of operation coefficients aq1 to aq6 and ap1 to ap6 in the second operation terms hry, hrm, hgy, hgc, hbm, hbc are varied, in embodiment 6.

The following description will discuss the first operation terms and the second operation terms the value of which is set to zero. Moreover, consideration is further given to six hues. For example, supposing that the first color data, Ri, Gi, Bi, exhibit a red color, equations, r=W and g=b=0, hold with W being a constant. Therefore, y=m=W, and c=0. In this case, in the first operation terms, h1r=MIN (y, m)=W hold so that all the other five terms in the first operation terms become zero, as shown in FIG. 15. Moreover, in this case, it is clear that all the second operation terms are zero, and this fact is also shown by FIG. 17. In other words, with respect to red, only the effective operation term is h1r=MIN (y, m). In the same manner, the following terms form only the effective first operation terms: with respect to green, h1g=MIN (c, y), with respect to blue, h1b=MIN (m, c), with respect to cyan, h1c=MIN (g, b), with respect to magenta, h1m=MIN (b, r), and with respect to yellow, h1y=MIN (r, g).

Next, consideration will be given to intermediate areas (inter-hue areas) between six hues. For example, with respect to the area from red to yellow, b=c=0 holds as shown in FIG. 14. Therefore, as shown in FIG. 15, in the first operation terms, the terms, h1g=MIN (c, y), h1c=MIN (g, b), h1b=MIN (m, c) and h1m=MIN (b, r), are set to zero, and only the terms, h1r=MIN (y, m) and h1y=MIN (r, g), are effective operation terms. As a result, as shown in FIG. 17, only the term, h2ry=MIN (h1y, h1r), serves as an effective operation term in the second operation terms, the other five terms except for this become zero. In the same manner, the following terms respectively form the effective operation terms: with respect to yellow to green, h1y, h1g, h2gy, with respect to green to cyan, h1g, h1c, h2gc, with respect to cyan to blue, h1b, h1c, h2bc, with respect to blue to magenta, h1b, h1m, h2bm, and with respect to magenta to red, h1m, h1r, h2rm.

As described above, the number of operation terms in equation (17) that become effective simultaneously is at most four consisting of one of the first operation terms h1r, h1g and h1b, one of h1y, h1m and h1c, one of the second operation terms h2ry, h2gy, h2gc, h2bc, h2bm and h2rm, and the minimum value α of the first color data Ri, Gi and Bi.

In other words, by effectively utilizing the characteristics of hue data, the polynomial data (the first operation terms, second operation terms, α) of equation (17) can be reduced to four effective data among 13 data, when only the image data of each pixel has been taken into consideration.

Figure 19:
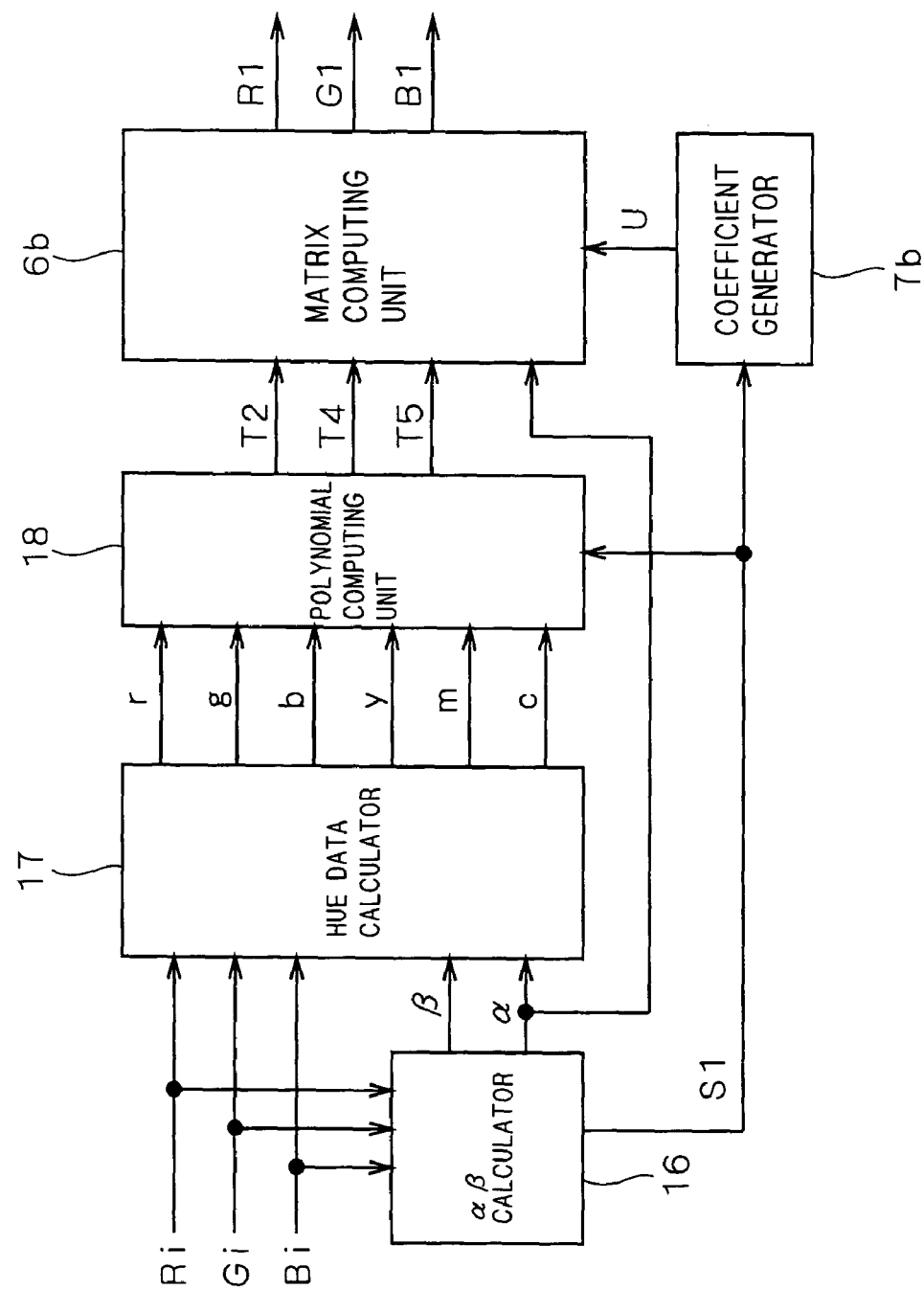
FIG. 19 is a block diagram showing one example of a configuration of first color correction amount calculation means in a color converter according to embodiment 6.

FIG. 19 is a block diagram showing one example of a configuration of first color correction amount calculation means 1 in a color converter according to embodiment 6 of the present invention. In this Figure, reference numeral 16 is an $\alpha\beta$ calculator which calculates the maximum value $\beta$=MAX (Ri, Gi, Bi) and the minimum value $\alpha$=MIN (Ri, Gi, Bi) of the inputted first color data Ri, Gi, Bi, and outputs the resulting values, and which also generates an identification code S1 for specifying data having the maximum value and data having the minimum value, and outputs the code; 17 is a hue data calculator which calculates hue data r, g, b, y, m, c from the first color data Ri, Gi, Bi and the output from the $\alpha\beta$ calculator; 18 is a polynomial computing unit; 6b is a matrix computing unit; and 7b is a coefficient generator.

Figure 20:
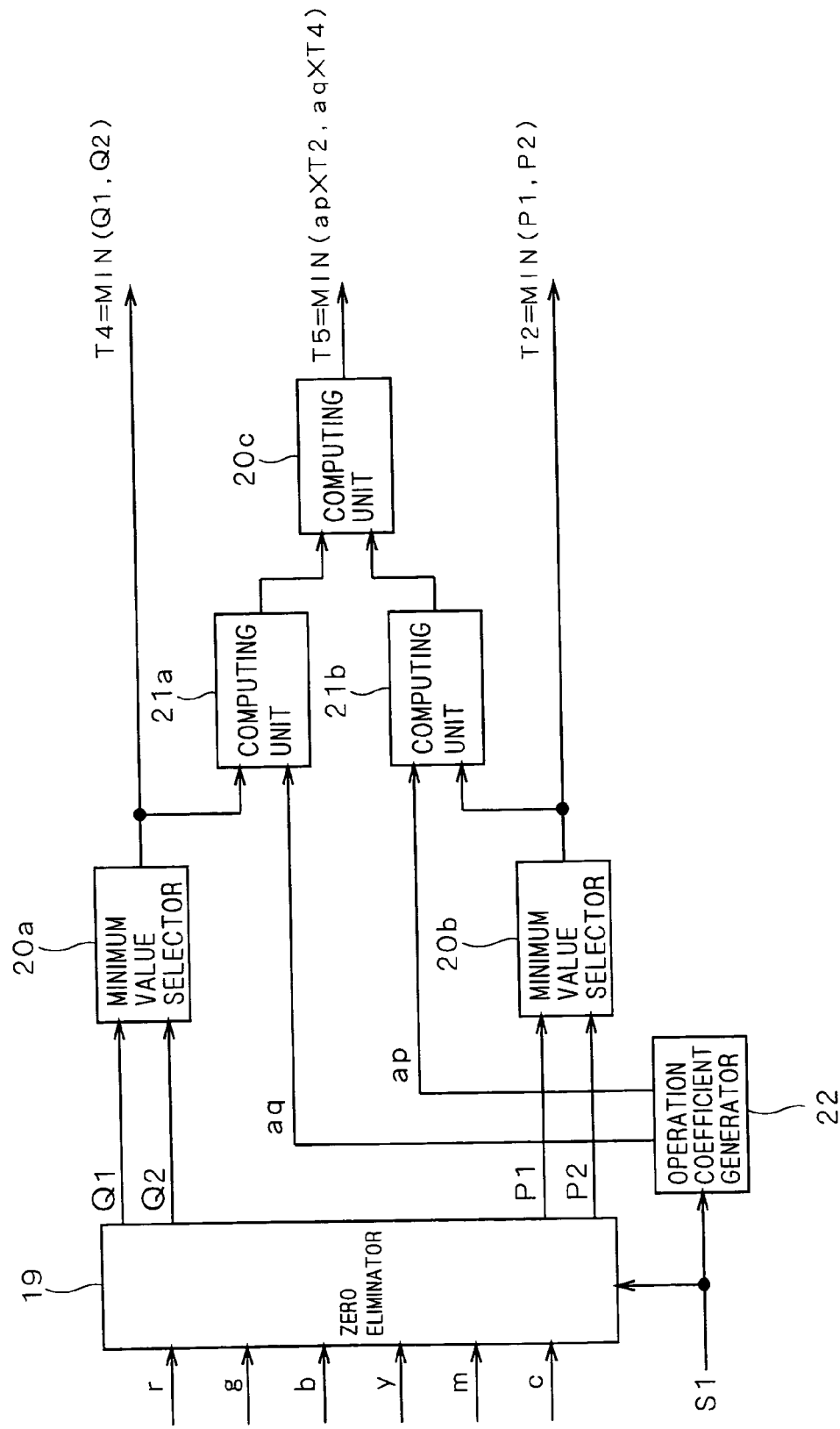
FIG. 20 is a block diagram showing one example of a configuration of a polynomial computing unit in the color converter according to embodiment 6.

Moreover, FIG. 20 is a block diagram showing one structural example of the polynomial computing unit 18 shown in FIG. 19. In this figure, reference numeral 19 is a zero eliminator which eliminates data that become zero among the inputted hue data, 20a, 20b and 20c are minimum value selectors which select the minimum value of data inputted from the zero eliminator 19, and output the resulting value, 22 is an operation coefficient generator which generates and outputs operation coefficients aq and ap on the basis of the identification code S1 from the $\alpha\beta$ calculator, and 21a and 21b are computing units which carry out multiplying processes between the operation coefficients aq and ap from the above-mentioned operation coefficient generator 22 and the outputs of the minimum value selectors 20a and 20b.

Next, the following description will discuss operations of the above-mentioned first color correction amount calculation means. The first color data Ri, Gi, Bi, inputted to the first color correction amount calculation means, are sent to the $\alpha\beta$ calculator 16 and the hue data calculator 17. The $\alpha\beta$ calculator 16 calculates the maximum value $\beta$ and the minimum value $\alpha$ of the first color data Ri, Gi, Bi, and outputs the resulting values, and also generates and outputs an identification code S1 that specifies data forming the maximum value and data forming the minimum value from the first color data Ri, Gi, Bi.

The hue data calculator 17 uses the inputted first color data Ri, Gi, Bi, and the inputted maximum value $\beta$ and the minimum value $\alpha$ from the above-mentioned $\alpha\beta$ calculator 16, and carries out subtraction processes of r=Ri−$\alpha$, g=Gi−$\alpha$, b=Bi−$\alpha$ and y=$\beta$−Bi, m=$\beta$−Gi, c=$\beta$−Ri, thereby outputting six hue data, r, g, b, y, m and c.

At this time, the maximum value $\beta$ and the minimum value $\alpha$ calculated in the $\alpha\beta$ calculator 16 are represented by $\beta$=MAX (Ri, Gi, Bi) and $\alpha$=MIN (Ri, Gi, Bi), and since the six hue data, r, g, b, y, m, c, calculated in the hue data calculator 17 are obtained through the subtraction processes of r=Ri−$\alpha$, g=Gi−$\alpha$, b=Bi−$\alpha$ and y=$\beta$−Bi, m=$\beta$−Gi, c=$\beta$−Ri, the resulting six hue data are allowed to have a characteristic in which at least two terms thereof become zero.

For example, in the case where the maximum value $\beta$ is Ri and the minimum value $\alpha$ is Gi ($\beta$=Ri, $\alpha$=Gi), the above-mentioned subtraction processes yield g=0 and c=0. Moreover, in the case where the maximum value $\beta$ is Ri and the minimum value $\alpha$ is Bi ($\beta$=Ri, $\alpha$=Bi), the above-mentioned subtraction processes yield b=0 and c=0. In other words, depending on the combinations of Ri, Gi, Bi that form the maximum value and the minimum value, at least one of r, g, b and one of y, m, c, that is, the total two values, become zero.

Therefore, it can be said that the identification code S1, outputted from the above-mentioned $\alpha\beta$ calculator 16, specifies data that become zero among six hue data. This identification code S1 generates six kinds of values depending on which values of Ri, Gi, Bi the maximum value $\beta$ and the minimum value $\alpha$ take. FIG. 21 is a diagram that shows the corresponding relationships among the value of the identification code S1, the maximum value $\beta$ and the minimum value $\alpha$ in the first color data Ri, Gi, Bi and the hue data that become zero at that time. Here, the value of the identification code S1 in the Figure shows one example, and not limited to the specific value, another value may be used.

Six hue data, r, g, b and y, m, c, outputted from the hue data calculator 17, are sent to the polynomial computing unit 18. Moreover, the identification code S1, outputted from the above-mentioned $\alpha\beta$ calculator 16, is also inputted to the polynomial computing unit 18.

Referring to FIG. 20, the following description will discuss the operation of the polynomial computing unit 18. In the polynomial computing unit 18, six hue data from the hue data calculator 17 and the identification code S1 from the $\alpha\beta$ calculator are inputted to the zero eliminator 19. On the basis of the identification code S1, the zero eliminator 19 outputs two data Q1, Q2 that are not zero among r, g, b, and two data P1, P2 that are not zero among y, m, c. Q1, Q2, P1 and P2 are determined as shown in FIG. 22. For example, in the case of identification code S1=0, as shown in FIG. 22, outputs are Q1=r, Q2=b, P1=m and P2=y.

Here, in the same manner as FIG. 21, the value of the identification code S1 in the FIG. 22 shows one example, and not limited to the specific value, another value may be used.

The minimum value selector 20a selects the minimum value T4=MIN (Q1, Q2) of the output data Q1, Q2 outputted from the above-mentioned zero eliminator 19, and outputs the resulting value, and the minimum value selector 20b selects the minimum value T2=MIN (P1, P2) of the output data P1, P2 outputted from the above-mentioned zero eliminator 19, and outputs the resulting value. As described above, Q1, Q2 are two data that are not zero among r, g, b; consequently, T4 forms an effective operation term of the first operation terms h1y, h1m, h1c in equation (17). In the same manner, P1, P2 are two data that are not zero among y, m, c; consequently, T2 forms an effective operation term of the first operation terms h1r, h1g, h1b in equation (17).

Moreover, the identification code S1 is inputted from the above-mentioned $\alpha\beta$ calculator 16 to the operation coefficient generator 22, and the operation coefficient generator 22 generates operation coefficients aq and ap in accordance with the value of the identification code S1, and outputs the resulting coefficients to the computing units 21a, 21b. The computing units 21a and 21b carry out calculations of aq×T4 and ap×T2 on the effective first operation terms T4 and T2, and output the resulting values to the minimum value selector 20c. Then, the minimum value selector 20c selects the minimum value T5=MIN (aq×T4, ap×T2) from the outputs of the computing units 21a and 21b, and outputs the resulting values. As described above, T4 and T2 are the first operation terms that are effective in equation (17); consequently, T5 =(aq×T4, ap×T2) form the second operation terms that are effective in equation (17).

In other words, the operation coefficients aq and ap, outputted from the operation coefficient generator 22, correspond to the operation coefficients aq1 to aq6 and ap1 to ap6 that are used for calculations of the second operation terms h2ry, h2gy, h2gc, h2bc, h2bm, h2rm in equation (17). On the basis of the identification code S1, the operation coefficient generator 22 determines the second operation terms that are effective, and extracts the corresponding operation coefficients aq and ap from aq1 to aq6 and ap1 to ap6, and outputs the resulting coefficients.

As described above, T2, T4 and T5 are outputted from the polynomial computing unit 18 as polynomial data. Further, T2, T4 and T5 are sent to the matrix computing unit 6b. Moreover, the minimum value α of the first color data Ri, Gi, Bi, obtained by the αβ calculator 16, is also inputted to the matrix computing unit 6b.

The coefficient generator 7b determines the first operation terms and the second operation terms that are effective on the basis of the identification code S1, and generates the operation coefficient Uij formed by extracting elements corresponding to these from the operation matrix Fij shown in equation (17), and outputs this to the matrix computing unit 6b.

The matrix computing unit 6b, which has received the polynomial data T2, T4, T5 from the polynomial computing unit 18, the minimum value α of the first color data from the αβ calculator 16, and the coefficient matrix Uij from the coefficient generator 7b, as inputs, carries out operations of the following equation (18), and outputs the first color correction amounts R1, G1, B1.

$$\begin{bmatrix} R1 \\ G1 \\ B1 \end{bmatrix} = (Uij) \begin{bmatrix} T2 \\ T4 \\ T5 \\ \alpha \end{bmatrix} \quad \text{Equation (18)}$$

With respect to equation (18), in Uij, i=1 to 3 and j=1 to 4.

As described above, equation (18) represents matrix operations consisting of the first operation terms and the second operation terms that are effective (not zero) in equation (17), the minimum value α of the first color data, and coefficient matrix elements corresponding to these, and makes it possible to provide the same operation results as equation (17).

Here, FIG. 23 is a block diagram showing one portion of the structure of the matrix computing unit 6b, and shows a structure in which R1 of the first color correction amounts is calculated and outputted. In this Figure, reference numerals 10d to 10g are multipliers and 11c to 11e are adders.

The multipliers 10d to 10g receive the polynomial data T2, T4, T5 from the polynomial computing unit 18, the minimum value α from the αβ calculator 16 and the coefficient matrix Uij from the coefficient generator 7b, as inputs, and outputs the respective products.

The adders 11c and 11d receive the products that are outputs from the respective multipliers 10d to 10g as inputs, add these input data, and output the sum. The adder 11e adds data from the adders 11c and 11d, and outputs the sum as the first color correction amount R1.

As also indicated by equation (18), the first color correction amounts R1, G1, B1 can be respectively calculated by using one of the arrangements of FIG. 23, by selecting the elements of the coefficient matrix Uij. Here, for example, by using the three arrangements of FIG. 23, the calculations of R1, G1, B1 may be carried out through parallel processes; thus, it becomes possible to carry out high-speed matrix operations.

As described above, in accordance with the first color correction amount calculation means according to the present embodiment, thirteen polynomial data in the matrix operations of equation (17) (the first operation terms, second operation terms, and minimum value α of the first color data) are reduced to four effective polynomial data so that the first color correction amounts R1, G1, B1 can be calculated by using equation (18).

Therefore, in comparison with a case in which matrix operations of equation (17) are actually carried out, it becomes possible to greatly reduce the number of the operations. Thus, it becomes possible to greatly reduce the operation load, and to greatly cut the circuit scale particularly in the case of a hardware configuration.

Moreover, since the operations of the first color correction amounts are basically carried out on the basis of equation (17), it is possible to carry out a correction process on only a target hue or a predetermined area between hues in an independent manner, and also to correct the degree of a change in the area between hues independently, as has been described earlier. In other words, it is possible to flexibly change conversion characteristics.

Here, as described above, depending on combinations of the first color data Ri, Gi, Bi, at least not less than two values of the hue data r, g, b, y, m, c are set to zero. In other words, there are sometimes cases in which not less than three of six hue data become zero. However, FIGS. 21 or 22 does not show a case in which not less than three hue data become zero. In the case where not less than three of hue data become zero, the following processes may be carried out.

For example, in the case of Ri>Gi=Bi, since β=Ri and α=Gi, Bi, g=b=c=0; thus, there might be a case in which three of the hue data become zero. At this time, as shown in FIG. 21, this case corresponds to both of the cases of the identification codes S1=0 and S1=1. However, in either of the cases of S1=0 and S2=1, the same operation results are obtained depending on combinations of Q1, Q2, P1, P2 in FIG. 22 so that both of the cases can provide desired operation results, that is, T2=h1r=MIN (y, m) and T4=T5=0. Here, the same is true to other combinations which set three of the six hue data to zero.

Moreover, in the case of Ri=Gi=Bi, that is, all the six hue data are zero, as shown in FIG. 21, these cases correspond to all the identification codes S1=0 to 5. In this case also, any of the identification codes S1=0 to 5 makes it possible to provide desired operation results T2=T4=T5=0.

In other words, in the case where not less than three of hue data become zero, desired one of a plurality of corresponding identification codes may be selected. Here, any selection method may be used. It is of course possible to provide an arrangement in which identification codes that correspond to respective cases which set not less than three of the hue data to zero are prepared.

Additionally, the present embodiment has been described on the premise that a hardware configuration is adopted; however, the sequence of the color-conversion processes shown in the present embodiment may be achieved on a software basis.

While the invention has been shown and described in detail, the foregoing description is in all aspects illustrative and not restrictive. It is therefore understood that numerous modifications and variations can be devised without departing from the scope of the invention.

The invention claimed is:

1. A color converter which carries out color correction on first color data to convert to second color data corresponding to said first color data, comprising:

first color correction amount calculation means for calculating a first color correction amount on the basis of said first color data by using a matrix computing system;

multiplication coefficient calculation means for calculating a multiplication coefficient on the basis of characteristic information of said first color data;

second color correction amount calculation means for calculating a second color correction amount by multiplying said first color correction amount by said multiplication coefficient; and color correction amount addition means for calculating said second color data by adding said second color correction amount to said first color data.

2. The color converter according to claim 1, wherein the characteristic information of said first color data is brightness.

3. The color converter according to claim 2, wherein the value of said multiplication coefficient calculated by said multiplication coefficient calculation means becomes smaller as said brightness becomes smaller than a predetermined value.

4. The color converter according to claim 2, wherein the value of said multiplication coefficient calculated by said multiplication coefficient calculation means becomes smaller as said brightness becomes larger than a predetermined value.

5. The color converter according to claim 1, wherein the characteristic information of said first color data is saturation.

6. The color converter according to claim 5, wherein the value of said multiplication coefficient calculated by said multiplication coefficient calculation means becomes smaller as said saturation becomes higher than a predetermined value.

7. The color converter according to claim 1, further comprising:

characteristic information calculation means for calculating said characteristic information on the basis of said first color data.

8. The color converter according to claim 7, wherein said characteristic information calculated by said characteristic information calculation means is brightness of said first color data, and said brightness is calculated as a sum of values obtained by multiplying the respective components of said first color data by predetermined coefficients.

9. The color converter according to claim 7, wherein said characteristic information calculated by said characteristic information calculation means is brightness of said first color data, and said brightness is calculated as the maximum value of the components of said first color data.

10. The color converter according to claim 7, wherein said characteristic information calculated by said characteristic information calculation means is saturation of said first color data, and said saturation is calculated on the basis of a difference between the maximum value of the components of said first color data and the minimum value of the components of said first color data.

11. The color converter according to claim 1, wherein said multiplication coefficient calculation means includes a look up table storing said multiplication coefficient corresponding to said characteristic information.

12. The color converter according to claim 1, wherein said first color data and said first color correction amounts are respectively Ri, Gi, Bi and R1, G1, B1 corresponding to three primary color signals of red, green and blue, and said first color correction calculation means includes:

maximum value/minimum value calculation means for calculating the minimum value a and the maximum value b of said first color data;

hue data calculation means for calculating six hue data:
r=Ri−a,
g=Gi−a,
b=Bi−a,
y=b−Bi,
m=b−Gi and
c=b−Ri, respectively relating to red, green, blue, yellow, magenta and cyan, from said first color data and said minimum value a and maximum value b calculated by said maximum value/minimum value calculation means;

effective operation term calculation means for calculating, by using said hue data and a predetermined coefficients ap1 to ap6 and aq1 to aq6, a first effective operation term T2 having only a value which is not zero among
h1r=MIN(y, m),
h1g=MIN(c, y) and
h1b=MIN(m, c) or a zero value when all the h1r, h1g and h1b are zero, a second effective operation term T4 having only a value which is not zero among
h1y=MIN(r, g),
h1c=MIN(g, b) and
h1m=MIN(b, r) or a zero value when all the h1y, h1c and h1m are zero, and a third effective operation term T5 having only a value which is not zero among
h2ry=MIN(aq1'h1y, ap1'h1r),
h2rm=MIN(aq2'h1m, ap2'h1r),
h2gy=MIN(aq3'h1y, ap3'h1g),
h2gc=MIN(aq4'h1c, ap4'h1g),
h2bm=MIN(aq5'h1m, ap5'h1b) and
h2bc=MIN(aq6'h1c, ap6'h1b) or a zero value when all the h2ry, h2rm, h2gy, h2gc, h2bm and h2bc are zero;

coefficient generation means for calculating a coefficient matrix Uij on the basis of said minimum value a and maximum value b calculated by said maximum value/minimum value calculation means; and matrix operation means for carrying out the following matrix operation:

on the basis of said first effective operation term T2, second effective operation term T4 and third effective operation term T5 calculated by said operation term calculation means, said minimum value a calculated by said maximum value/minimum value calculation means and the coefficient matrix Uij calculated by said coefficient generation means, thereby calculating said first color correction amounts Ri, Gi, Bi.

13. A color converting method which carries out color correction on first color data to convert to second color data corresponding to said first color data, comprising the steps of:

(a) calculating a first color correction amount on the basis of said first color data by using a matrix computing system;

(b) calculating a multiplication coefficient on the basis of characteristic information of said first color data;

(c) calculating a second color correction amount by multiplying said first color correction amount by said multiplication coefficient; and (d) calculating said second color data by adding said second color correction amount to said first color data.

14. The color converting method according to claim 13, wherein
the characteristic information of said first color data is brightness.

15. The color converting method according to claim 14, wherein
the value of said multiplication coefficient calculated in said step (b) becomes smaller as said brightness becomes smaller than a predetermined value.

16. The color converting method according to claim 14, wherein
the value of said multiplication coefficient calculated in said step (b) becomes smaller as said brightness becomes larger than a predetermined value.

17. The color converting method according to claim 13, wherein
the characteristic information of said first color data is saturation.

18. The color converting method according to claim 17, wherein
the value of said multiplication coefficient calculated in said step (b) becomes smaller as said saturation becomes larger than a predetermined value.

19. The color converting method according to claim 13, further comprising the step of:
(e) calculating said characteristic information on the basis of said first color data.

20. The color converting method according to claim 19, wherein
said characteristic information calculated in said step (e) is brightness of said first color data, and
said brightness is calculated as a sum of values obtained by multiplying the respective components of said first color data by predetermined coefficients.

21. The color converting method according to claim 19, wherein
said characteristic information calculated in said step (e) is brightness of said first color data, and
said brightness is calculated as the maximum value of the components of said first color data.

22. The color converting method according to claim 19, wherein
said characteristic information calculated in said step (e) is saturation of said first color data, and
said saturation is calculated on the basis of a difference between the maximum value of the components of said first color data and the minimum value of the components of said first color data.

23. The color converting method according to claim 13, wherein
said first color data and said first color correction amounts are respectively Ri, Gi, Bi and R1, G1, B1 corresponding to three primary color signals of red, green and blue, and said step (c) includes the steps of:

(f) calculating the minimum value a and the maximum value b of said first color data;

(g) calculating six hue data:

r=Ri−a, g=Gi−a, b=Bi−a, y=b−Bi, m=b−Gi and c=b−Ri, respectively relating to red, green, blue, yellow, magenta and cyan, from said first color data and said minimum value a and maximum value b calculated in said step (f);

(h) calculating, by using said hue data calculated in said step (g) and a predetermined coefficients ap1 to ap6 and aq1 to aq6, a first effective operation term T2 having only a value which is not zero among h1r=MIN(y, m), h1g=MIN(c, y) and h1b=MIN(m, c) or a zero value when all the h1r, h1g and h1b are zero, a second effective operation term T4 having only a value which is not zero among h1y=MIN(r, g), h1c=MIN(g, b) and h1m=MIN(b, r) or a zero value when all the h1y, h1c and h1m are zero, and a third effective operation term T5 having only a value which is not zero among h2ry=MIN(aq1'h1y, ap1'h1r), h2rm=MIN(aq2'h1m, ap2'h1r), h2gy=MIN(aq3'h1y, ap3'h1g), h2gc=MIN(aq4'h1c, ap4'h1g), h2bm=MIN(aq5'h1m, ap5 =h1b) and h2bc=MIN(aq6'h1c, ap6'h1b) or a zero value when all the h2ry, h2rm, h2gy, h2gc, h2bm and h2bc are zero;

(i) calculating a coefficient matrix Uij on the basis of said a and b calculated in said step (f); and (j) carrying out the following matrix operation:

on the basis of said first effective operation term T2, second effective operation term T4 and third effective operation term T5 calculated in said step (h), said minimum value a calculated in said step (f) and the coefficient matrix Uij calculated in said step (i), thereby calculating said first color correction amounts R1, G1, B1.

* * * * *